(12) United States Patent
Hiramatsu et al.

(10) Patent No.: US 11,710,225 B2
(45) Date of Patent: Jul. 25, 2023

(54) SURFACE INSPECTION APPARATUS, NON-TRANSITORY COMPUTER READABLE MEDIUM STORING PROGRAM, AND SURFACE INSPECTION METHOD

(71) Applicant: FUJIFILM Business Innovation Corp., Tokyo (JP)

(72) Inventors: Takashi Hiramatsu, Kanagawa (JP); Kaito Tasaki, Kanagawa (JP); Kiyofumi Aikawa, Kanagawa (JP); Miho Uno, Kanagawa (JP); Hirokazu Ichikawa, Kanagawa (JP); Hiroko Onuki, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/515,542

(22) Filed: Oct. 31, 2021

(65) Prior Publication Data
US 2022/0392052 A1    Dec. 8, 2022

(30) Foreign Application Priority Data
Jun. 8, 2021    (JP) ................. 2021-095766

(51) Int. Cl.
G06T 7/00    (2017.01)
H04N 7/18    (2006.01)
G06V 10/22    (2022.01)
G06T 7/70    (2017.01)

(52) U.S. Cl.
CPC ............. *G06T 7/0006* (2013.01); *G06T 7/70* (2017.01); *G06V 10/225* (2022.01); *H04N 7/183* (2013.01); *G06T 2207/30108* (2013.01)

(58) Field of Classification Search
CPC ........ G06T 7/0006; G06T 2207/30108; G06V 10/225
See application file for complete search history.

(56) References Cited

U.S. PATENT DOCUMENTS 5,544,256 A  *  8/1996  Brecher ................. G06T 7/001
                                                        706/900
2007/0201739 A1* 8/2007 Nakagaki .............. G06T 7/0004
                                                        382/149

(Continued)

FOREIGN PATENT DOCUMENTS

JP    2001305075    10/2001
JP    2009264882    11/2009

*Primary Examiner* — Jayanti K Patel
*Assistant Examiner* — Christopher Kingsbury Glover
(74) *Attorney, Agent, or Firm* — JCIPRNET

(57) ABSTRACT

The disclosure provides a surface inspection apparatus for inspecting a surface of an object, a non-transitory computer readable medium thereof, and a surface inspection method thereof. According to an aspect of the disclosure, the surface inspection apparatus includes an imaging device configured to image a surface of an object to be inspected, and a processor configured to calculate a numerical value representing a quality of the surface by processing an image captured by the imaging device, and display, on a display device, the image including an index for specifying a position of a portion that has contributed to the calculation of the numerical value and the numerical value.

20 Claims, 20 Drawing Sheets

(56) References Cited

U.S. PATENT DOCUMENTS

| | | | | |
|---|---|---|---|---|
| 2010/0162401 | A1* | 6/2010 | Sakaki | G06Q 10/10 |
| | | | | 726/25 |
| 2018/0347970 | A1* | 12/2018 | Sasaki | G01B 11/2513 |
| 2019/0120770 | A1* | 4/2019 | Chen | G01B 11/303 |
| 2019/0139212 | A1* | 5/2019 | Hanzawa | G06V 10/774 |
| 2019/0285554 | A1* | 9/2019 | Konishi | G06T 1/00 |
| 2020/0134807 | A1* | 4/2020 | Ozaki | G06T 7/0004 |
| 2020/0234419 | A1* | 7/2020 | Ota | G01N 21/90 |
| 2020/0292462 | A1* | 9/2020 | Chen | G01N 21/95 |

\* cited by examiner (A)

(B)

(C)

PARTIAL REGION THAT CONTRIBUTES TO CALCULATION OF SCORE

SURFACE INSPECTION APPARATUS, NON-TRANSITORY COMPUTER READABLE MEDIUM STORING PROGRAM, AND SURFACE INSPECTION METHOD

CROSS-REFERENCE TO RELATED APPLICATIONS

This application is based on and claims priority under 35 USC 119 from Japanese Patent Application No. 2021-095766 filed Jun. 8, 2021.

BACKGROUND

(i) Technical Field

The present invention relates to a surface inspection apparatus, a non-transitory computer readable medium storing a program, and a surface inspection method.

(ii) Related Art

Today, in various products, parts made by molding synthetic resin (hereinafter referred to as "molded products") are used. On the other hand, visually observable defects may appear on the surface of the molded product. This type of defect includes a "sink mark" that is an unintentionally formed dent, a "weld" that is formed at a portion where the molten resin joins, and the like. In addition, even in the case of texture processing in which unevenness is intentionally formed on the surface, a difference from the expected texture may appear. The texture changes due to combined factors of color, luster, and unevenness.

SUMMARY

As an example of apparatuses that inspect the quality of the surface of an object, there is an apparatus that displays the quality of the inspected portion as a single numerical value. The quantified numerical value is highly objective, unlike the case of the sensory test. On the other hand, the primary portion that has contributed to the calculation of the numerical value cannot be understood only by displaying the numerical value. Therefore, an operator cannot check whether the portion where he/she pays attention to is used for the calculation of the numerical value or the portion that he/she does not expect is used for the calculation of the numerical value.

An example of related art includes JP2009-264882A.

Aspects of non-limiting embodiments of the present disclosure relate to a surface inspection apparatus and a non-transitory computer readable medium storing a program that make it possible to check whether or not a portion that has contributed to the calculation of a numerical value representing a quality of the surface matches the portion where an operator pays attention to, unlike a case where a relationship between the numerical value representing the quality of the surface and the portion that has contributed to the calculation is unknown.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a surface inspection apparatus including an imaging device configured to image a surface of an object to be inspected, and a processor configured to calculate a numerical value representing a quality of the surface by processing an image captured by the imaging device, and display, on a display device, the image including an index for specifying a position of a portion that has contributed to the calculation of the numerical value and the numerical value.

BRIEF DESCRIPTION OF THE DRAWINGS

Exemplary embodiment(s) of the present invention will be described in detail based on the following figures, wherein:

FIGS. 2A and 2B are diagrams illustrating an example of defects appearing on the surface of an inspection target, in which FIG. 2A shows an example of sink marks and FIG. 2B shows an example of a weld;

FIGS. 4A and 4B are diagrams illustrating a structural example of an optical system of the surface inspection apparatus according to the first exemplary embodiment, in which FIG. 4A shows schematically an internal structure of a housing of the surface inspection apparatus and FIG. 4B shows a structure of an opening portion pressed against the surface of an inspection target at the time of inspection;

FIGS. 17A and 17B are diagrams illustrating another example of an index representing a main factor portion used to calculate a score, in which FIG. 17A shows a case where a symbol is displayed at a position serving as a guide for an outer edge of a target partial region and FIG. 17B shows a case where the target partial region is represented by an arrow;

DETAILED DESCRIPTION

First Exemplary Embodiment

Usage Example of Surface Inspection Apparatus

Hereinafter, exemplary embodiments of the present invention will be described with reference to the drawings.

Figure 1:
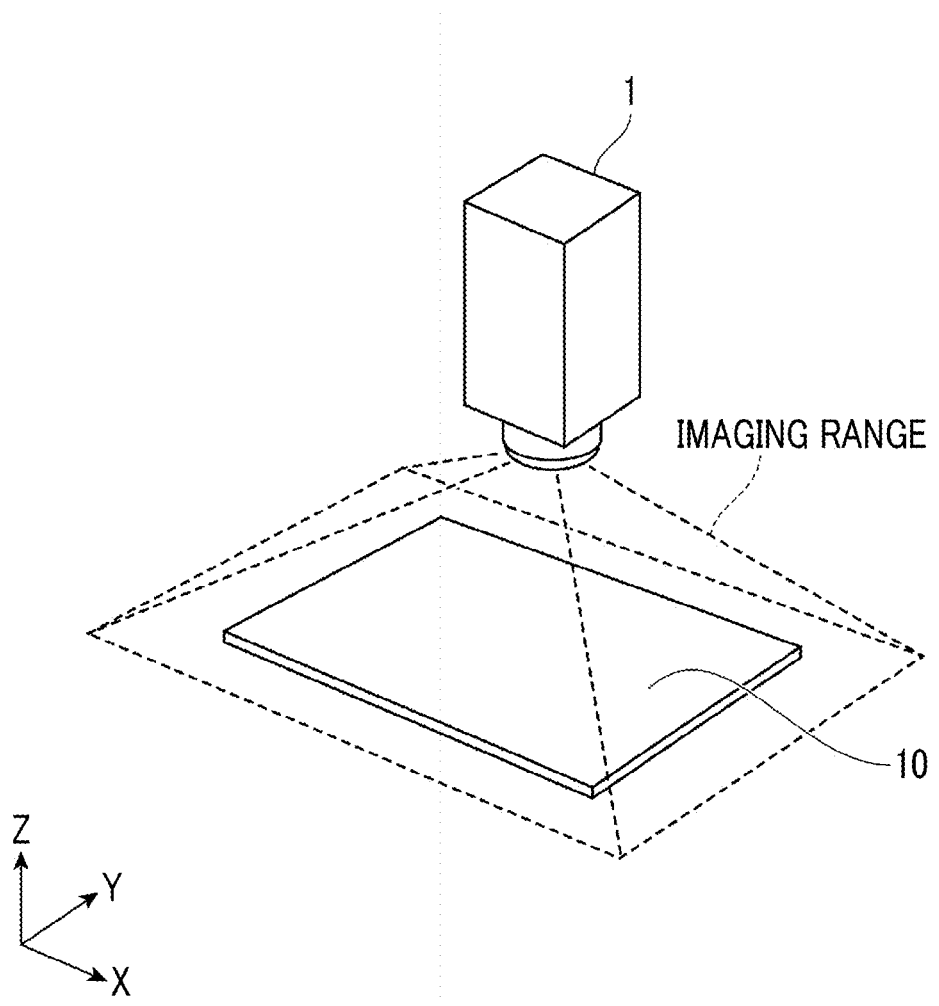
FIG. 1 is a diagram illustrating a usage example of a surface inspection apparatus assumed in a first exemplary embodiment.

FIG. 1 is a diagram illustrating a usage example of a surface inspection apparatus 1 assumed in a first exemplary embodiment.

An imaging unit of the surface inspection apparatus 1 used in the first exemplary embodiment is a so-called area camera, and a range to be imaged (hereinafter referred to as an "imaging range") is defined by a surface. Illuminations (not shown) are configured to include components that are specular reflection conditions over the entire imaging range.

In the case of FIG. 1, the imaging range includes the entire object to be inspected (hereinafter also referred to as an "inspection target") 10. However, the imaging range may include only a portion of the inspection target 10 of interest. A molded product is assumed as the inspection target 10 in the present exemplary embodiment.

In the case of the inspection by the area camera, the inspection by the surface inspection apparatus 1 and the inspection target 10 is performed in a stationary state. In other words, the inspection of the surface of the inspection target 10 is performed in a state where the surface inspection apparatus 1 and the inspection target 10 do not move relatively.

In the case of FIG. 1, the inspection target 10 has a plate shape, but the inspection target 10 may have any shape. For example, the inspection target 10 may have a shape having a curved surface such as a sphere or a cylinder, in addition to a polyhedron, for example.

The actual inspection target 10 may have holes, notches, protrusions, steps, and the like.

The types of surface finishes of the inspection target 10 include no processing, mirror finish processing, semi-mirror finish processing, and texturing processing.

The surface inspection apparatus 1 inspects defects on the surface and textures of the inspection target 10.

Defects include, for example, sink marks and welds. The sink mark refers to a dent on the surface generated in the thick portion or the rib portion, and the weld refers to a streak generated in the portion where the tips of the molten resin join in the mold. The defects also include scratches and dents caused by hitting an object.

The texture is a visual or tactile impression, and is influenced by the color, luster, and unevenness of the surface of the object. The unevenness of the surface also includes streaks generated in cutting the mold. This type of streak is different from a defect.

Figure 2A:
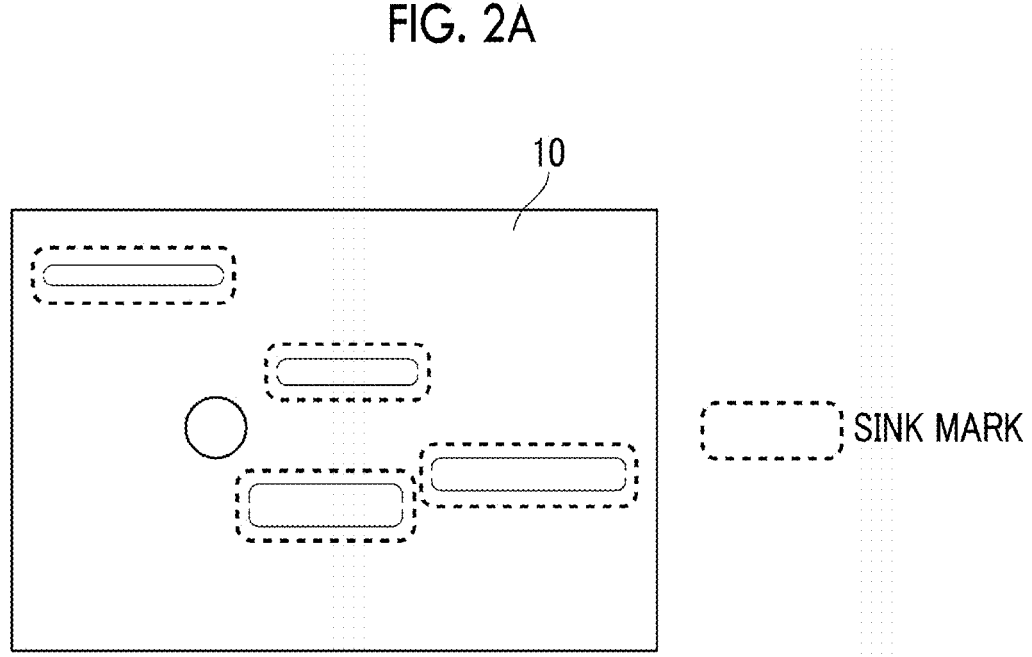
Figure 2B:
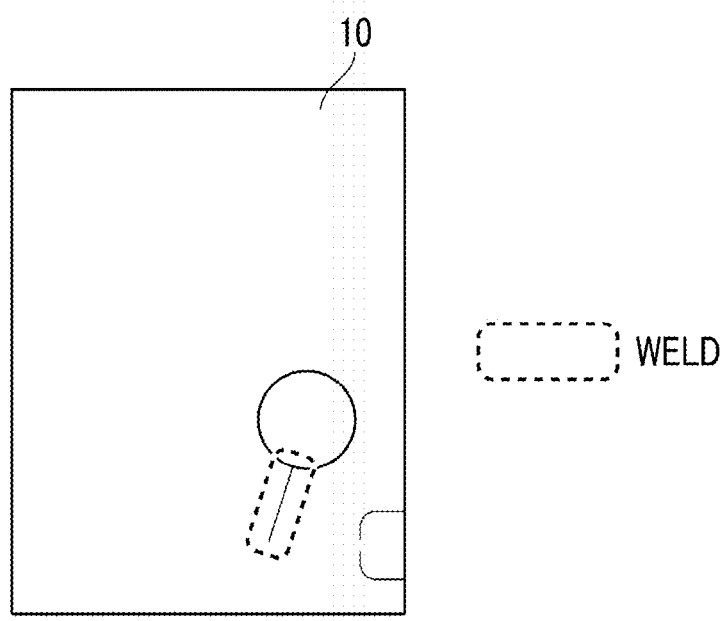

FIGS. 2A and 2B are diagrams illustrating an example of defects appearing on the surface of the inspection target 10. FIG. 2A shows an example of sink marks, and FIG. 2B shows an example of a weld. In FIGS. 2A and 2B, the defective portion is surrounded by a broken line. There are four sink marks in FIG. 2A.

The surface inspection apparatus 1 according to the present exemplary embodiment is used not only for inspection of defects and texture, but also for inspection of surface stains.

The surface inspection apparatus 1 generates an image in which defects on the surface of the inspection target 10 are emphasized, and quantifies a result of evaluating the texture to output the result.

The defects herein are unevenness and streaks appearing in the portion that should be flat, that is, sink marks and welds. The texture is evaluated by a numerical value (hereinafter also referred to as a "score"). The score is an example of a numerical value representing the quality of the surface of the inspection target 10.

For example, multivariate analysis is used to calculate the score. In multivariate analysis, for example, features appearing in the luminance distribution are analyzed. An example of a feature includes a streaky pattern extending along a direction of the sink mark, for example.

In addition, there is also a method of using artificial intelligence to calculate the score. For example, the score of a partial region within an inspection range is calculated by giving the image captured by the camera to a learning model obtained by deep machine learning of the relationship between the image of the defect and the score.

The inspection target 10 shown in FIG. 1 is installed parallel to the planes defined by an X axis and a Y axis. In this case, the normal of the surface of the inspection target 10 is parallel to a Z axis.

On the other hand, the surface inspection apparatus 1 is arranged vertically above the inspection target 10. In other words, an optical axis of an optical system used by the surface inspection apparatus 1 for imaging the inspection target 10 is set substantially parallel to the normal of the surface of the inspection target 10. Hereinafter, the conditions required for this optical axis are also referred to as "imaging conditions".

In this case, the surface inspection apparatus 1 is installed at a position that satisfies the imaging conditions. The surface inspection apparatus 1 may be installed by fixing the surface inspection apparatus to a specific member, or may be detachably attached to the specific member.

However, the surface inspection apparatus 1 may be a portable apparatus. In a case where the surface inspection apparatus is portable, an operator inspects any surface by, for example, holding the surface inspection apparatus 1 in his/her hand and directing the light receiving surface toward the inspection target 10.

In FIG. 1, for the purpose of describing the positional relationship between the surface inspection apparatus 1 and the inspection target 10, the appearance of the surface inspection apparatus 1 is simplified and represented as a substantially rectangular parallelepiped.

Configuration of Surface Inspection Apparatus

Figure 3:
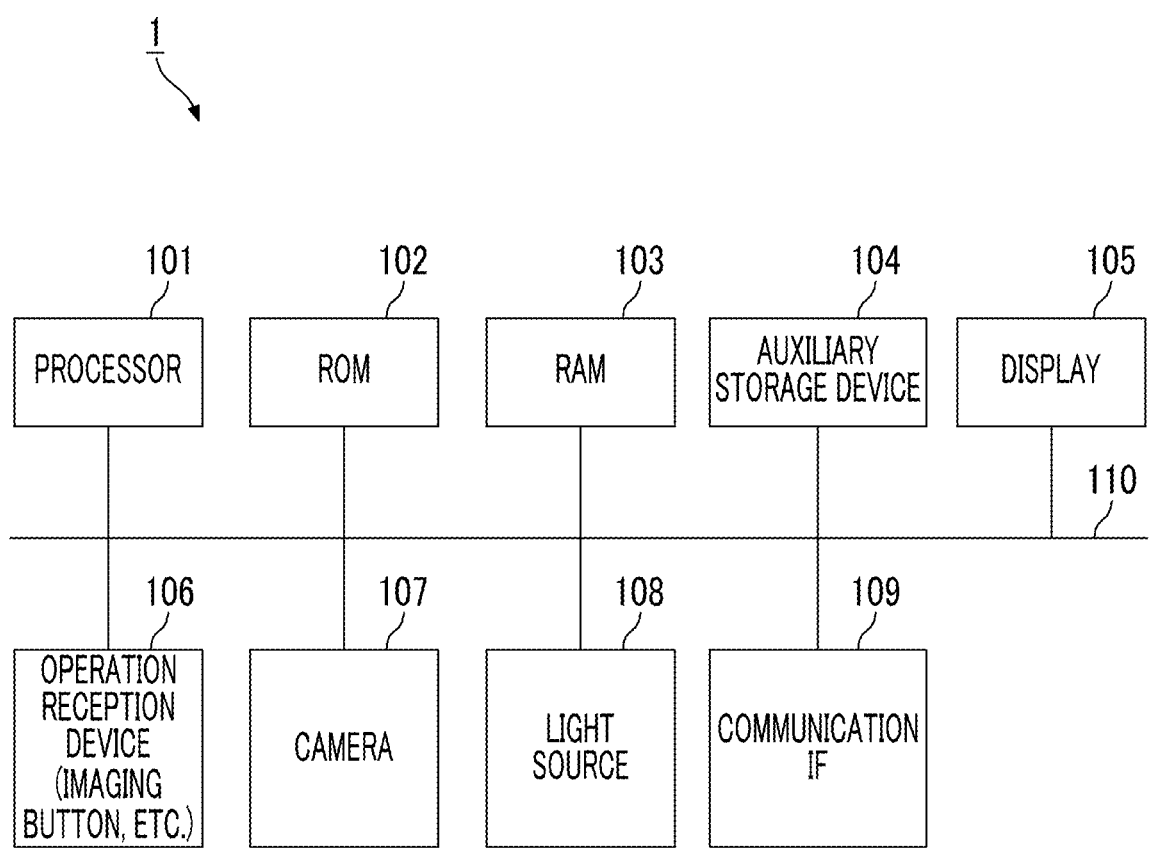
FIG. 3 is a diagram illustrating an example of a hardware configuration of the surface inspection apparatus used in the first exemplary embodiment.

FIG. 3 is a diagram illustrating an example of a hardware configuration of the surface inspection apparatus 1 used in the first exemplary embodiment.

The surface inspection apparatus 1 shown in FIG. 3 includes a processor 101 that controls the operation of the entire apparatus, a read only memory (ROM) 102 in which a basic input output system (BIOS) and the like are stored, a random access memory (RAM) 103 used as a work area of the processor 101, an auxiliary storage device 104 in which programs and image data are stored, a display 105 that displays a captured image of the surface of the inspection target 10 or information on operations, an operation reception device 106 that receives operations of an operator, a camera 107 that images the surface of the inspection target 10, a light source 108 that illuminates the surface of the inspection target 10, and a communication interface (IF) 109 used for communication with the outside. The processor 101 and each part are connected to each other through a signal line 110 such as a bus.

The processor 101, the ROM 102, and the RAM 103 function as so-called computers.

The processor 101 realizes various functions through the execution of a program. For example, the processor 101 performs the calculation or the like of the score for evaluating the texture of the imaged surface of the inspection target 10 through the execution of the program.

Image data obtained by imaging the surface of the inspection target 10 is stored in the auxiliary storage device 104. For the auxiliary storage device 104, for example, a semiconductor memory or a hard disk device is used. Firmware and application programs are also stored in the auxiliary storage device 104. In the following, firmware and application programs are collectively referred to as a "program".

The program that realizes the functions described in the present exemplary embodiment and other exemplary embodiments which will be described later can be provided not only by a communication unit but also by storing the program in a recording medium such as a CD-ROM.

The display 105 is, for example, a liquid crystal display or an organic EL display, and displays an image of the entire inspection target 10 or a specific portion of the inspection target 10. The display 105 is also used for positioning the imaging range with respect to the inspection target 10.

In the case of the present exemplary embodiment, the display 105 is integrally provided in the main body of the surface inspection apparatus, but may be an external device connected through the communication IF 109 or a part of another device connected through the communication IF 109. For example, the display 105 may be a display of another computer connected through the communication IF 109.

The operation reception device 106 is configured with a touch sensor arranged on the display 105, physical switches and buttons arranged on a housing, and the like.

In the case of the present exemplary embodiment, a power button and an imaging button are provided as an example of physical buttons. In a case where the power button is operated, for example, the light source 108 is turned on and the imaging by the camera 107 is started. Further, in a case where the imaging button is operated, a specific image captured by the camera 107 at the time of operation is acquired as an image for inspection.

A device that integrates the display 105 and the operation reception device 106 is called a touch panel. The touch panel is used to receive operations of a user on keys displayed in software (hereinafter also referred to as "soft keys").

In the case of the present exemplary embodiment, a color camera is used as the camera 107. For the image sensor of the camera 107, for example, a charge coupled device (CCD) imaging sensor element or a complementary metal oxide semiconductor (CMOS) imaging element is used.

Since a color camera is used as the camera 107, it is possible in principle to observe not only the luminance of the surface of the inspection target 10 but also the color tone. The camera 107 is an example of an imaging device.

In the case of the present exemplary embodiment, a white light source is used as the light source 108. The white light source generates light in which light in a visible light band is evenly mixed.

In the case of the present exemplary embodiment, a parallel light source is used as the light source 108. Further, a telecentric lens is arranged on the optical axis of the camera 107.

The light source 108 in the present exemplary embodiment is arranged at an angle at which a light component specular-reflected on the surface of the inspection target 10 is mainly incident on the camera 107.

The communication IF 109 is configured with a module conforming to a wired or wireless communication standard. For the communication IF 109, for example, an Ethernet (registered trademark) module, a universal serial bus (USB), a wireless LAN, or the like is used.

Structure of Optical System

Figure 4A:
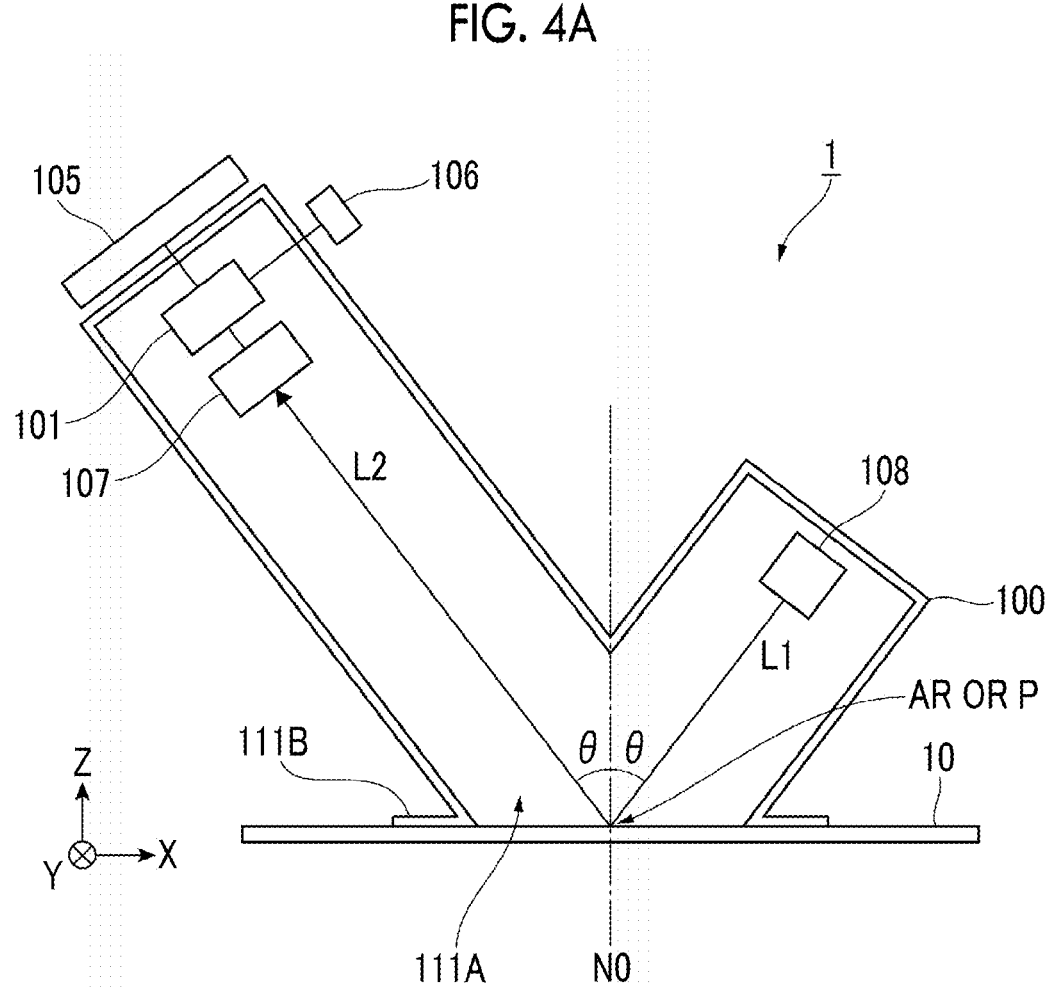
Figure 4B:
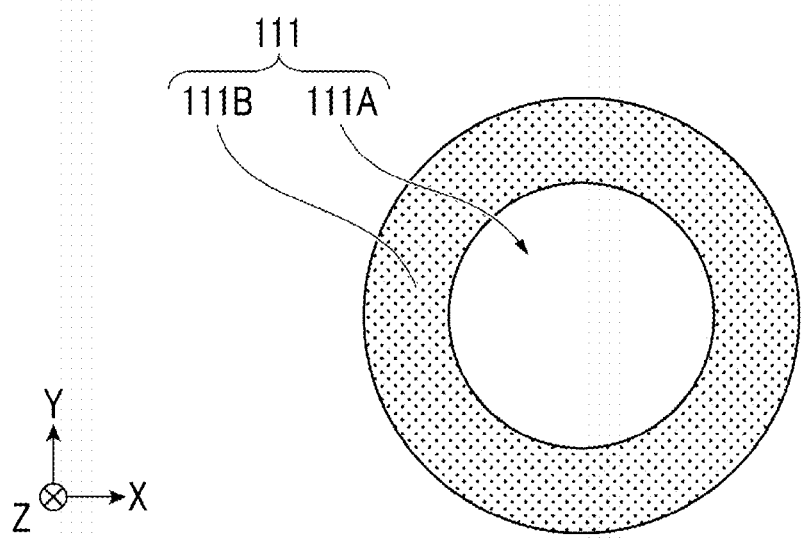

FIGS. 4A and 4B are diagrams illustrating a structural example of an optical system of the surface inspection apparatus 1 according to the first exemplary embodiment. FIG. 4A shows schematically an internal structure of a housing 100 of the surface inspection apparatus 1, and FIG. 4B shows a structure of an opening portion 111 pressed against the surface of the inspection target 10 at the time of inspection.

The opening portion 111 is provided with an opening 111A into which illumination light illuminating the surface of the inspection target 10 and reflected light reflected by the surface of the inspection target 10 are input/output, and a flange 111B surrounding an outer edge of the opening 111A.

In the case of FIGS. 4A and 4B, both the opening 111A and the flange 111B have a circular shape. However, the opening 111A and the flange 111B may have other shapes. For example, the opening 111A and the flange 111B may have a rectangular shape.

The opening 111A and the flange 111B do not have to have similar shapes, the opening 111A may have a circular shape, and the flange 111B may have a rectangular shape.

The flange 111B is used for positioning the surface inspection apparatus 1 in an imaging direction with respect to the surface of the inspection target 10. In other words, the flange 111B is used for positioning the camera 107 and the light source 108 with respect to the surface to be inspected. The flange 111B also serves to prevent or reduce the incident of external light or ambient light on the opening 111A.

The housing 100 shown in FIG. 4A has a structure in which two members having a substantially tubular shape are connected, and the light source 108 is attached to one member side, and the camera 107 and the processor 101 are attached to the other member side.

Further, the display 105 and the operation reception device 106 are attached to the side surface of the housing 100 on the side where the camera 107 is attached.

A modulation transfer function (MTF) in the field of view of the camera 107 is generally uniform. Therefore, the variation in contrast due to the difference in the position in the field of view is small, and the surface of the inspection target 10 can be faithfully imaged.

In the case of FIG. 4A, in the flat plate-shaped inspection target 10, the normal of the surface of the inspection target 10 is indicated by N0. Further, in FIG. 4A, the optical axis of the illumination light output from the light source 108 is indicated by L1, and the optical axis of the reflected light specular-reflected on the surface of the inspection target 10 is indicated by L2. The optical axis L2 herein coincides with the optical axis of the camera 107.

The surface of the actual inspection target 10 has structural or design unevenness, curved surfaces, steps, joints, fine unevenness formed in the molding process, and the like.

Therefore, as the normal N0 of the inspection target 10, an average value of the normal N0 of a region AR of interest in the inspection target 10 or the normal N0 of a specific position P of interest may be used.

Further, as the normal line N0 of the inspection target 10, the normal line N0 of the average virtual surface or the representative portion of the inspection target 10 may be used.

In the case of FIGS. 4A and 4B, the optical axis L1 of the illumination light output from the light source 108 and the optical axis L2 of the camera 107 are both attached at an angle θ with respect to the normal line N0. For the angle θ, for example, approximately 30° or approximately 45° is used.

Inspection Operation

Figure 5:
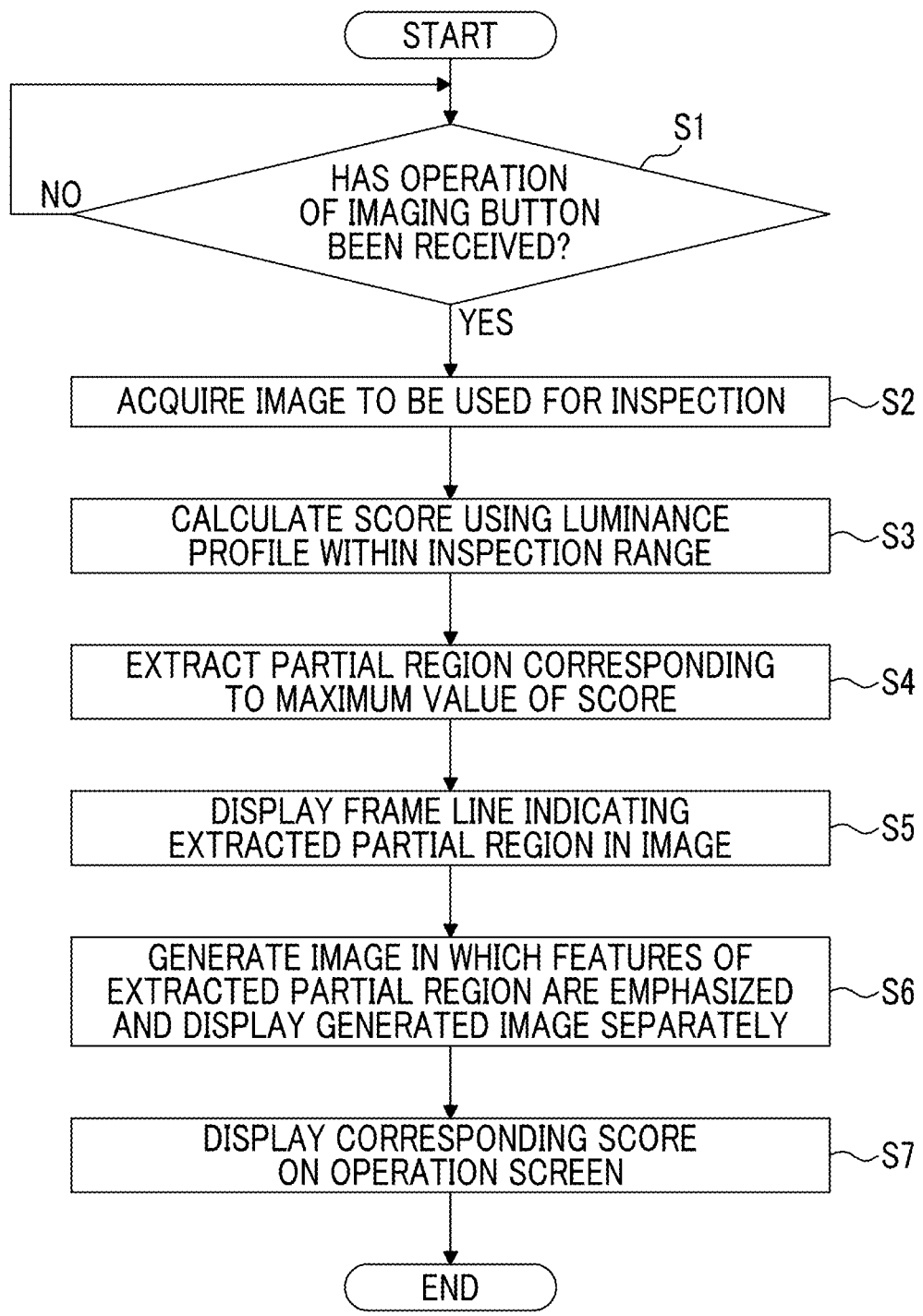
FIG. 5 is a flowchart illustrating an example of an inspection operation by the surface inspection apparatus used in the first exemplary embodiment.

FIG. 5 is a flowchart illustrating an example of an inspection operation by the surface inspection apparatus 1 used in the first exemplary embodiment. The symbol S shown in the figure means a step.

The process shown in FIG. 5 is implemented through the execution of the program by the processor 101 (see FIGS. 4A and 4B).

In the surface inspection apparatus 1 according to the present exemplary embodiment, the light source 108 (see FIGS. 4A and 4B) is turned on by operating the power button, and the imaging by the camera 107 (see FIGS. 4A and 4B) is started. The captured image is displayed on the display 105 (see FIGS. 4A and 4B).

Figure 6:
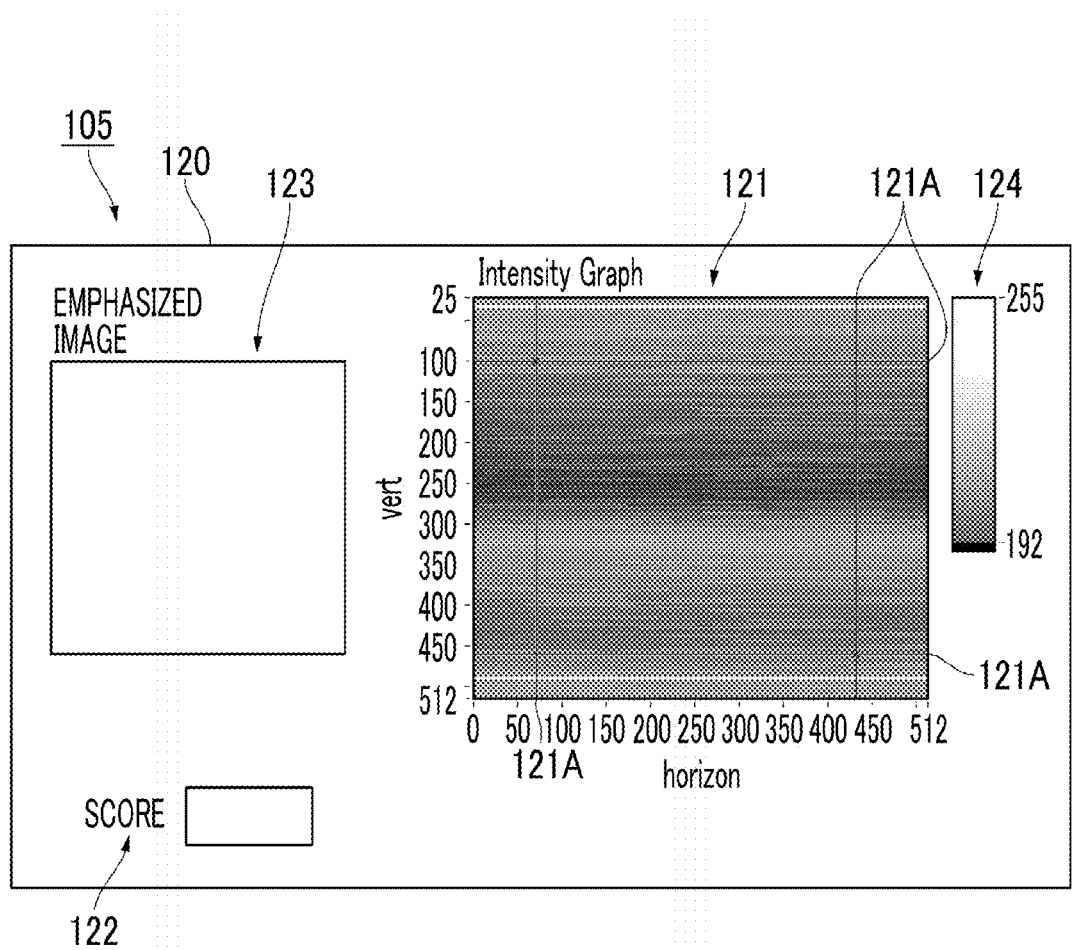
FIG. 6 is a diagram illustrating an example of an operation screen displayed on a display.

FIG. 6 is a diagram illustrating an example of an operation screen 120 displayed on the display 105. On the operation screen 120 shown in FIG. 6, a display field of an image (hereinafter referred to as a "captured image field") 121 captured by the camera 107, a score field 122, a display field of an image in which the features of a partial region that has contributed to the calculation of the score are emphasized (hereinafter referred to as an "emphasized image field") 123, and a legend 124 are arranged.

In the captured image field 121, a distribution of luminance values, that is, a grayscale image is displayed. In the case of FIG. 6, a line 121A that gives the outer edge of the inspection range used for the calculation of the score is displayed.

In the example of FIG. 6, the range surrounded by four lines 121A is the inspection range. For images within the inspection range, a score representing the quality of the surface is calculated.

The legend 124 is shown on the right side of the captured image field 121. In the case of FIG. 6, the shading of the captured image field 121 corresponds to the gradation values "192" to "255".

In the case of the operation screen 120 shown in FIG. 6, since the score has not been calculated yet, the score field 122 is blank and the image is not displayed in the emphasized image field 123 either.

FIG. 5 is referred to again for description.

In the present exemplary embodiment, in a case where an operator checking the image displayed on the display 105 operates the imaging button, the image used for evaluating the quality of the surface is determined.

Therefore, the processor 101, which has started the inspection operation by operating the power button, determines whether or not the operation of the imaging button has been received (step S1). The operation of the operation button is an example of an operation of giving an instruction to start an inspection.

While a negative result is obtained in step S1, the processor 101 repeats the determination in step S1.

In a case where a positive result is obtained in step S1, the processor 101 acquires an image to be used for inspection (step S2). Specifically, the image displayed on the display 105 at the time when the imaging button is operated is acquired.

In the case of the present exemplary embodiment, in a case where the imaging button is operated, the update of the image displayed in the captured image field 121 (see FIG. 6) is stopped even though the imaging by the camera 107 is continued.

Next, the processor 101 calculates the score using the luminance profile within the inspection range (step S3).

Figure 7:
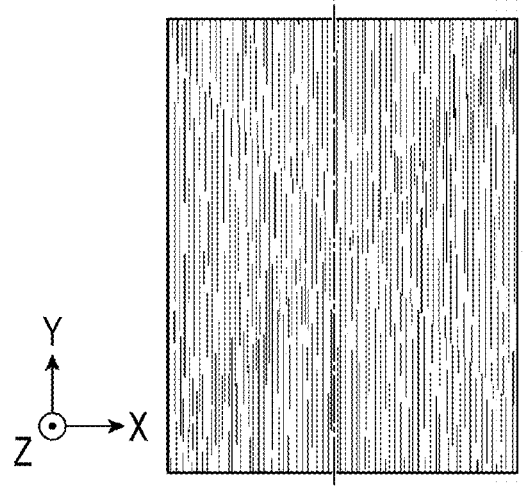
FIG. 7 is a diagram illustrating a principle of score calculation, in which a part (A) in FIG. 7 shows an example of an image acquired as a target of inspection, a part (B) in FIG. 7 shows an example of a cross section of a dent formed in a Y-axis direction in an X-axis direction, and a part (C) in FIG. 7 shows a luminance profile of the image.
Figure 7:
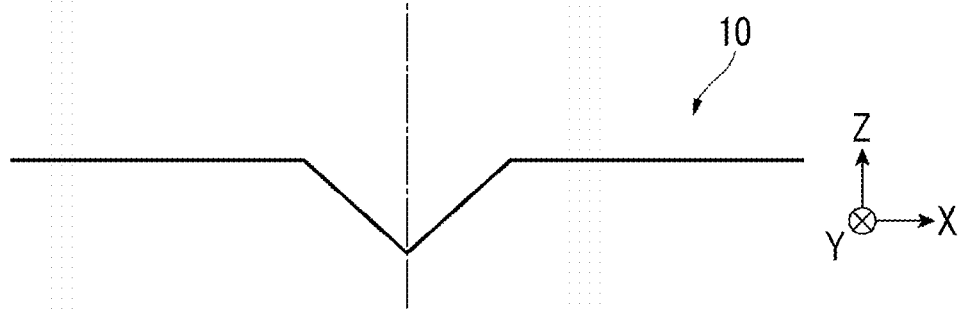
Figure 7:
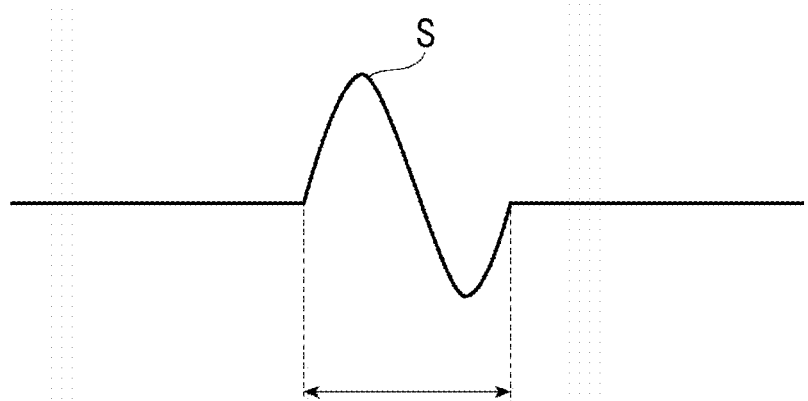

FIG. 7 is a diagram illustrating a principle of score calculation. A part (A) in FIG. 7 shows an example of an image acquired as a target of inspection, a part (B) in FIG. 7 shows an example of a cross section of a dent formed in a Y-axis direction in an X-axis direction, and a part (C) in FIG. 7 shows a luminance profile S of the image.

The dent shown in the part (B) in FIG. 7 represents, for example, a sink mark. The part (B) FIG. 7 shows a case where the cross-sectional shape is an isosceles triangle for convenience of description, but of course, this shape is an example.

In this case, the luminance profile S shown in the part (C) in FIG. 7 is given as a change in a luminance value (hereinafter referred to as a "representative luminance value") representing each coordinate in the X-axis direction.

The representative luminance value herein is given as an integral value of the luminance values of the pixels having an identical X coordinate. The convex waveform of the luminance profile S shows a bright region as compared with the surroundings, and the concave waveform of the luminance profile S shows a dark region as compared with the surroundings.

The score is calculated as, for example, a difference between the maximum value and the minimum value of the luminance profile S.

The score depends on the width, height, depth, number, etc. of the unevenness formed on the surface. For example, even though the height of the convex portion and the depth of the concave portion are identical, the score of the partial region where the convex portion or the concave portion having a longer width is formed becomes high.

Further, even though the widths of the convex portion and the concave portion are identical, the score of the partial region where the higher convex portion and the deeper concave portion are formed becomes high. In the case of the present exemplary embodiment, a high score means poor quality.

In the present exemplary embodiment, the partial region that contributes to the calculation of the score is defined as a space between the start point of the convex waveform and the end point of the concave waveform of the luminance profile S shown in the part (C) in FIG. 7.

FIG. 5 is referred to again for description.

In a case where the score is calculated, the processor 101 extracts the partial region corresponding to the maximum value of the score (step S4). The partial region herein is an image portion that has contributed to the calculation of the score in the inspection region. In a case where a plurality of maximum values of scores are found, a plurality of partial regions are extracted. Basically, one partial region is extracted.

Subsequently, the processor 101 displays a frame line indicating the extracted partial region in the image (step S5). Further, the processor 101 generates an image in which the features of the extracted partial region are emphasized (hereinafter referred to as an "emphasized image") and displays the generated image separately (step S6).

In the present exemplary embodiment, the processor 101 extracts a specific periodic component appearing in a specific direction from the extracted partial region, and generates an emphasized image by superimposing the feature image on the original image by the inverse transformation of the extracted periodic component.

For the extraction of periodic components, for example, two-dimensional DCT (=Discrete Cosine Transform), DST (=Discrete Sine Transform), FFT (=Fast Fourier Transform), and the like are used.

In inverse transformation to the feature image, an intensity component (that is, a luminance value) of each pixel is normalized by the maximum value, and a gradation range of the feature image is expanded. In addition, by mapping a color component to the intensity component of the feature image, it is possible to distinguish the feature image from the original image portion expressed in gray scale.

By displaying the emphasized image, it is possible to check the surface state even in a case where it is difficult to visually recognize the minute structure in the grayscale image obtained by imaging the surface of the partial region where the score is calculated.

In the case of the present exemplary embodiment, the generated emphasized image is displayed side by side in the operation screen identical to the grayscale image captured by the camera 107.

In addition, the processor 101 displays the corresponding score on the operation screen 120 (see FIG. 6) and ends the process (step S7).

Example of Operation Screen

Hereinafter, an example of a screen displayed at the time of inspection of the inspection target 10 by the surface inspection apparatus 1 will be described.

Screen Example 1

Figure 8:
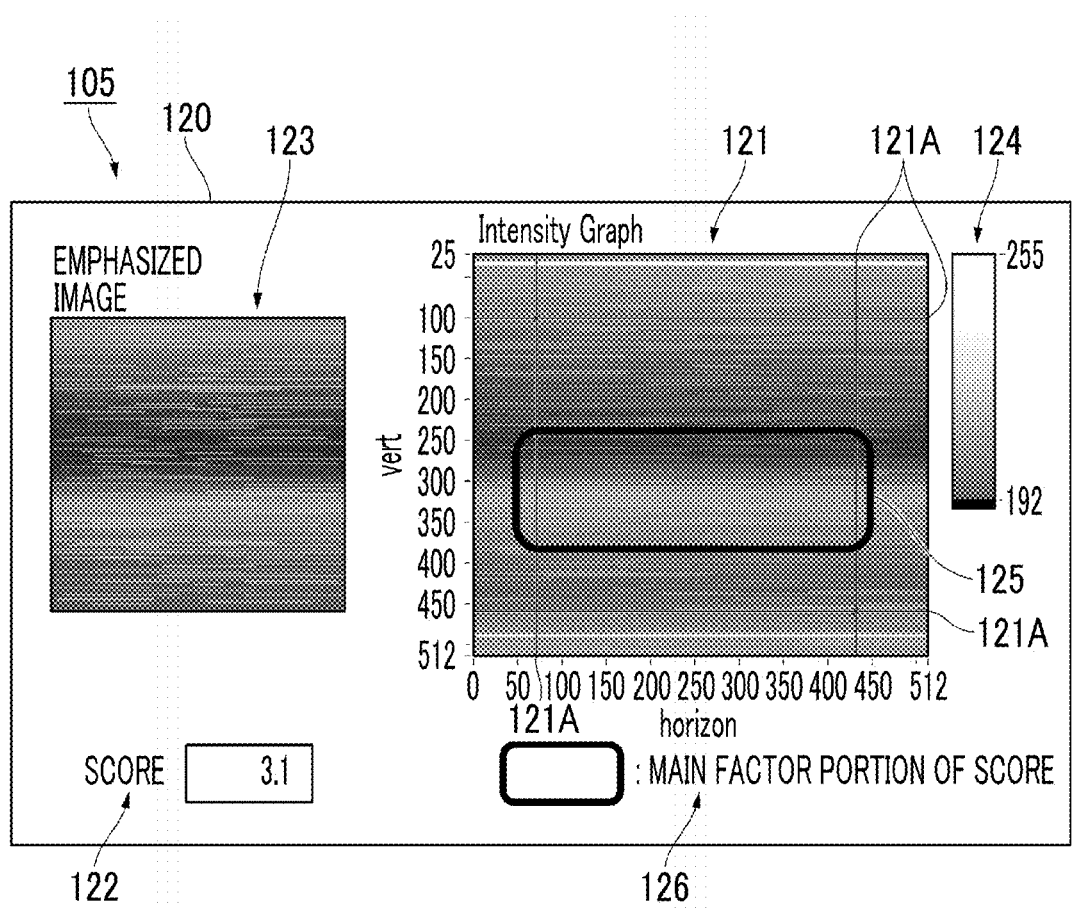
FIG. 8 is a diagram illustrating an example of the operation screen on which a main factor portion of a score is displayed.

FIG. 8 is a diagram illustrating an example of the operation screen 120 on which a main factor portion of a score is displayed. In FIG. 8, portions corresponding to the portions in FIG. 6 are denoted by the corresponding reference numerals.

In the case of FIG. 8, in the captured image field 121, a streaky pattern in which high luminance and low luminance are adjacent to each other appears near the center of the image.

In the score field 122 of the operation screen 120, a numerical value of "3.1" is displayed as the score calculated for this partial region.

Further, in the captured image field 121, a frame line 125 indicating a portion that has contributed to the calculation of the score (hereinafter referred to as a "main factor portion") is displayed to be superimposed on the original image. In the case of FIG. 8, the frame line 125 is a substantially rectangular shape having rounded corners.

The display of the frame line 125 makes it possible to determine whether or not the partial region used to calculate the numerical value displayed in the score field 122 matches the partial region where the operator pays attention to.

The frame line 125 herein is an example of "an index for specifying a position of a portion that has contributed to the calculation of the score".

The frame line 125 shown in FIG. 8 surrounds a periphery of the partial region that has contributed to the calculation of the score, thereby providing a boundary between the partial region that has contributed to the calculation of the score and the other partial regions.

On the operation screen 120 shown in FIG. 8, a legend 126 relating to the frame line 125 is added below the captured image field 121.

In the case of FIG. 8, in the emphasized image field 123 of the operation screen 120, an emphasized image of the region portion surrounded by the frame line 125 is displayed. Therefore, even in a case where it is difficult to check the state of the surface of the inspection target 10 only with the image captured by the camera 107, the state of the surface can be checked.

Screen Example 2

Figure 9:
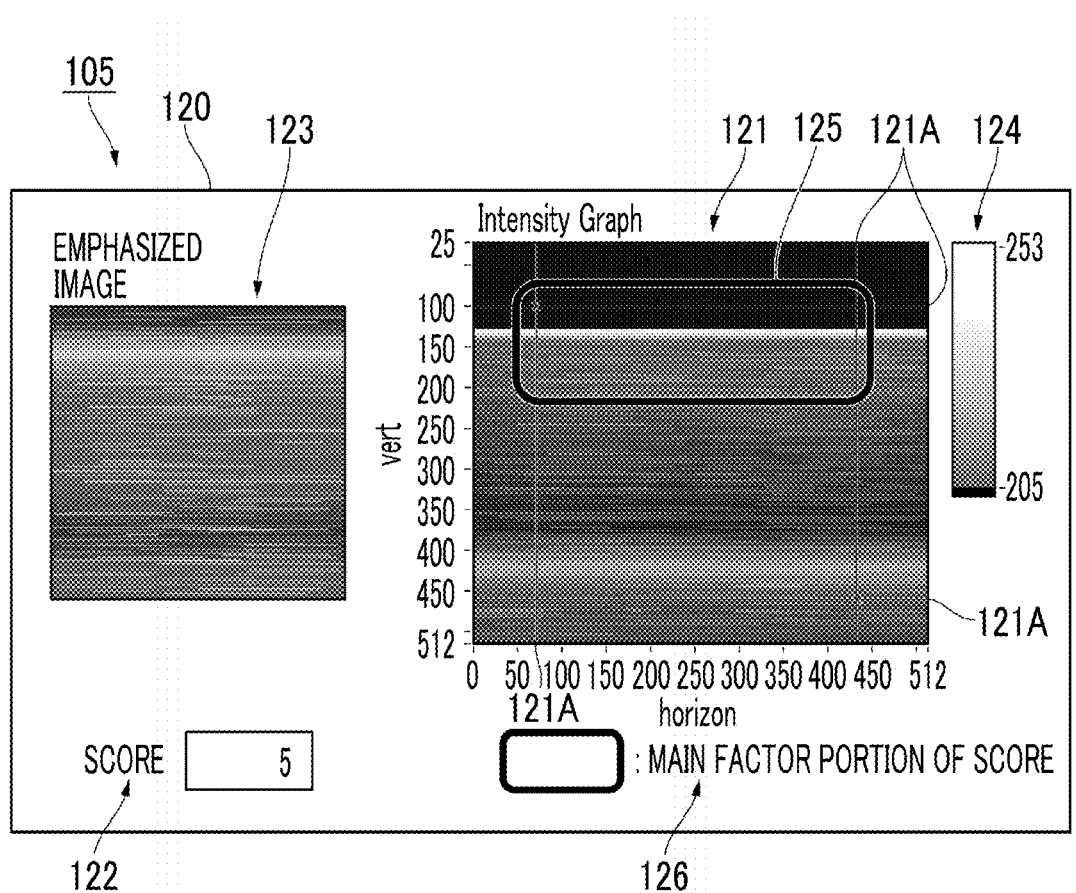
FIG. 9 is a diagram illustrating another example of the operation screen on which a main factor portion of a score is displayed.

FIG. 9 is a diagram illustrating another example of the operation screen 120 on which a main factor portion of a score is displayed. In FIG. 9, portions corresponding to the portions in FIG. 8 are denoted by the corresponding reference numerals.

In the case of FIG. 9, the frame line 125 indicating the main factor portion that has contributed to the calculation of the score is displayed near the upper part of the captured image field 121.

The captured image field 121 shown in FIG. 9 includes a streaky pattern in which high luminance and low luminance are adjacent to each other, but the difference in luminance within the partial region surrounded by the frame line 125 is larger. Therefore, the frame line 125 is displayed near the upper part of the captured image field 121. The score is "5".

Meanwhile, the portion surrounded by the frame line 125 corresponds to the structural outer edge of the inspection target 10 (see FIG. 1) and its background.

Therefore, the operator can notice that the score displayed on the operation screen is not the score of the portion of his/her interest. In this case, the operator retakes the image to be inspected.

The processor 101 may output an error signal notifying that the captured image is unsuitable for surface quality inspection in a case where a pattern of luminance difference exceeding the threshold value is detected in the image.

Further, the processor 101 may output an error signal even in a case where the calculated score exceeds the threshold value. For example, in a case where the threshold value is "4", the processor 101 outputs an error signal in a case where "5" is calculated as the score.

In a case where the error signal is output, the processor 101 may discard the image used to calculate the score and autonomously reacquire another image. In addition, the processor 101 may notify the operator of the need for reimaging. The notification may use a display or a sound. In this case, the processor 101 may display the reason why reimaging is considered necessary.

Screen Example 3

Figure 10:
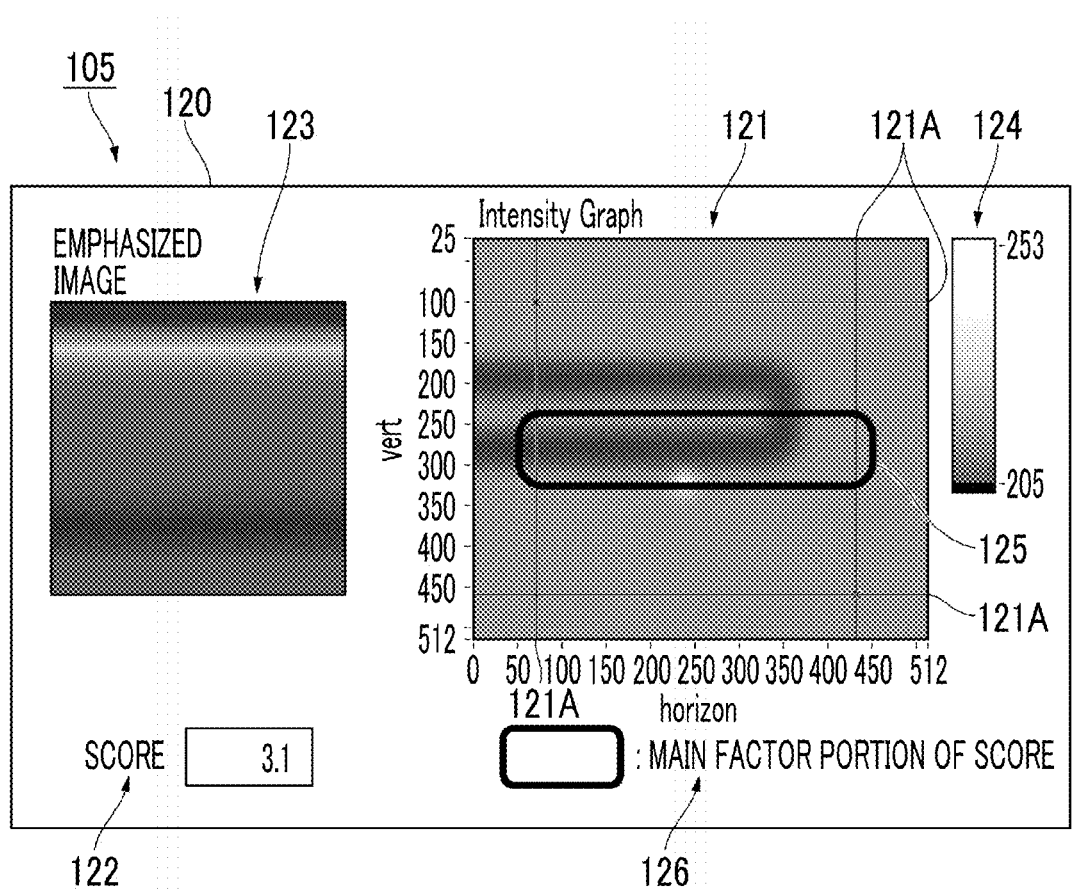
FIG. 10 is a diagram illustrating a display example of a frame line in a case where a plurality of streaky patterns are included in an image captured by a camera.

FIG. 10 is a diagram illustrating a display example of the frame line 125 in a case where a plurality of streaky patterns are included in an image captured by the camera 107 (see FIG. 3). In FIG. 10, portions corresponding to the portions in FIG. 8 are denoted by the corresponding reference numerals.

In the case of FIG. 10, the captured image field 121 of the image to be inspected includes two streaky patterns in the horizontal direction. In other words, in FIG. 10, there are two score candidates displayed in the score field 122.

Even in this case, the processor 101 (see FIG. 3) displays the highest score out of the two scores in the score field 122. Further, the processor 101 superimposes and displays the frame line 125 indicating the streaky pattern that has contributed to the calculation of the score displayed in the score field 122 on the image in the captured image field 121. Specifically, the processor 101 displays the frame line 125 surrounding the lower pattern of the two streaky patterns.

From this display, the operator knows that the score in the score field 122 is calculated from the lower pattern.

Screen Example 4

Figure 11:
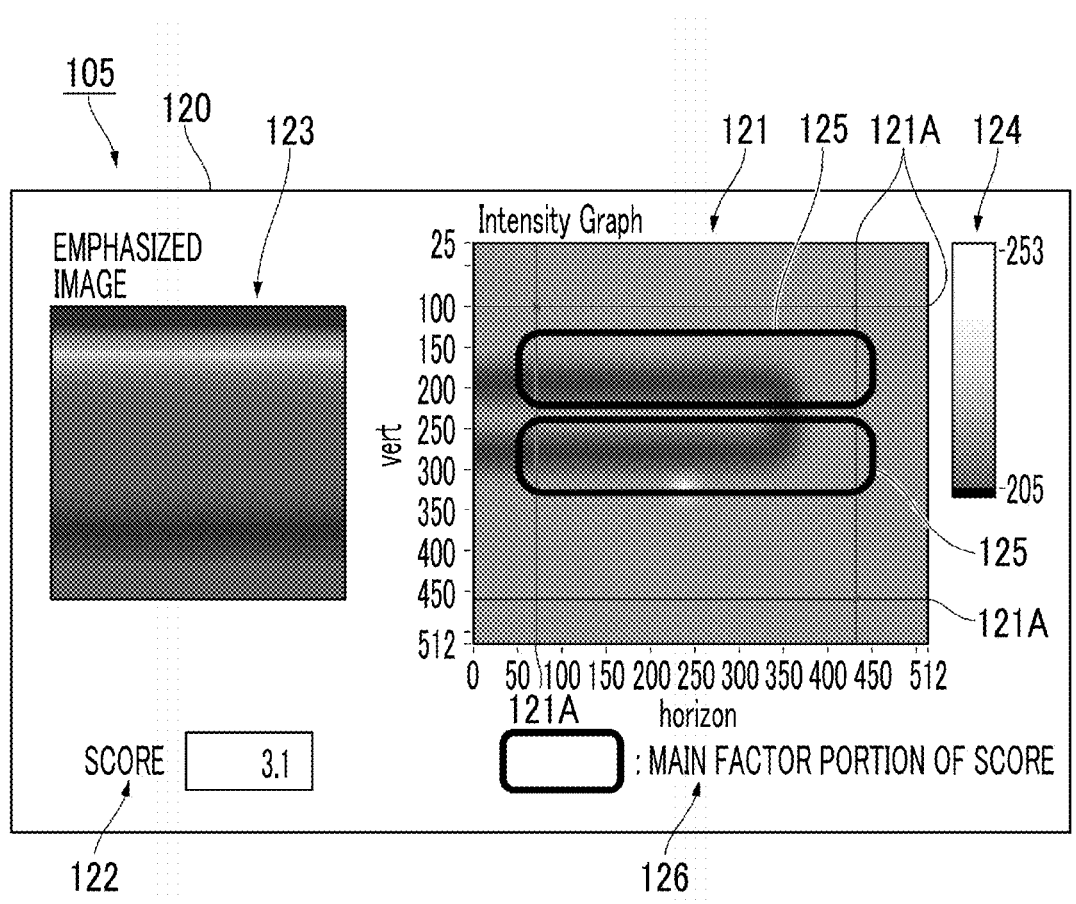
FIG. 11 is a diagram illustrating another display example of a frame line in a case where a plurality of streaky patterns are included in the image captured by the camera.

FIG. 11 is a diagram illustrating another display example of the frame line 125 in a case where a plurality of streaky patterns are included in the image captured by the camera 107 (see FIG. 3). In FIG. 11, portions corresponding to the portions in FIG. 8 are denoted by the corresponding reference numerals.

In the case of FIG. 11, the captured image field 121 of the image to be inspected includes two streaky patterns in the horizontal direction.

Here, in a case where the two scores calculated for the two partial regions corresponding to each of the two streaky patterns have an identical value, the two frame lines 125 are displayed in the captured image field 121.

However, the operation screen 120 shown in FIG. 11 also appears in a case where the partial region corresponding to the score in which a difference between the maximum value of the score and the second and subsequent scores is smaller than the threshold value is also displayed by the frame line 125.

Even in a case where there are three or more scores where the difference between the maximum value of the score and the second and subsequent scores is smaller than the threshold value, the number of frame lines 125 displayed in the captured image field 121 may be limited to a predetermined number. For example, only two of the frame line 125 indicating the partial region corresponding to the maximum score and the frame line 125 indicating the partial region corresponding to the second highest score may be displayed in the captured image field 121.

In the example of FIG. 11, the two frame lines 125 are displayed in an identical form. Therefore, the operator who sees the operation screen 120 shown in FIG. 11 can check that there are two partial regions having an identical score or two partial regions having substantially an identical score.

Meanwhile, in the display form shown in FIG. 11, it is not possible to know whether the two scores corresponding to the two partial regions have an identical value or different values. Further, in a case where there is a difference in the scores, it is not possible to know which partial region corresponds to the score displayed in the score field 122.

Also in the case of FIG. 11, the emphasized image of the partial region corresponding to the maximum value of the score is displayed in the emphasized image field 123.

Screen Example 5

Figure 12:
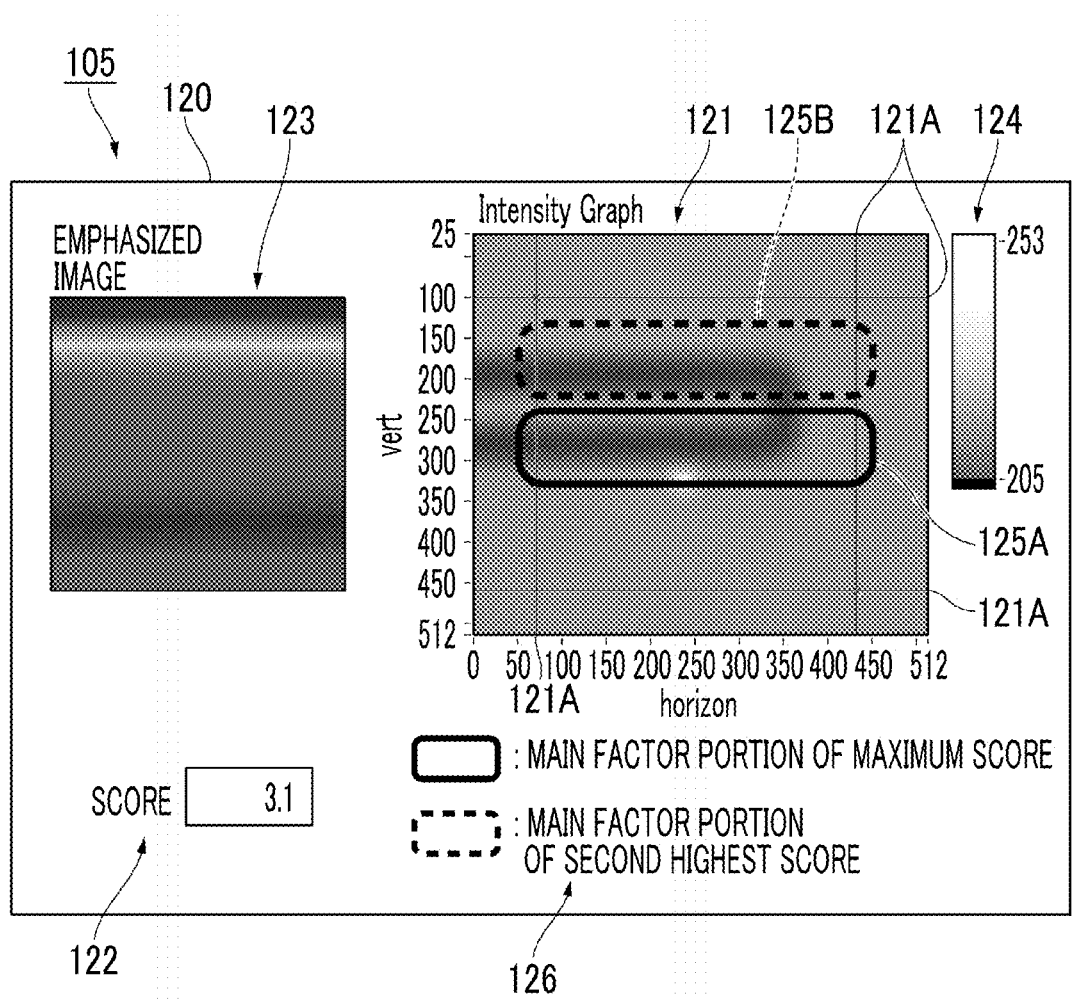
FIG. 12 is a diagram illustrating another display example of a frame line in a case where a plurality of streaky patterns are included in the image captured by the camera.

FIG. 12 is a diagram illustrating another display example of the frame line 125 in a case where a plurality of streaky patterns are included in the image captured by the camera 107 (see FIGS. 4A and 4B). In FIG. 12, portions corresponding to the portions in FIG. 11 are denoted by the corresponding reference numerals.

In the screen example shown in FIG. 12, the difference in the magnitude of the score is expressed by the difference in the color of the frame line 125. For example, a frame line 125A surrounding the partial region corresponding to the maximum value of the score is displayed in red, and a frame line 125B surrounding the partial region corresponding to the second highest score is displayed in green. In the example of FIG. 12, the difference in display color is expressed by the difference in line type.

In a case where the difference in the magnitude of the score can be identified, the luminance of the frame line 125A and the luminance of the frame line 125B may be changed, or only one of the frame line 125A and the frame line 125B may be displayed by blinking.

Further, the difference in the magnitude of the score may be expressed by the difference in the line type such as a double line or a broken line. That is, the difference in the magnitude of the score may be expressed by the difference in the display form.

In the case of FIG. 12, the description of the frame line 125B is added as the legend 126. With the addition of this description, the operator can know which of the partial region indicated by the frame line 125A and the partial region indicated by the frame line 125B corresponds to the maximum value of the score.

Screen Example 6

Figure 13:
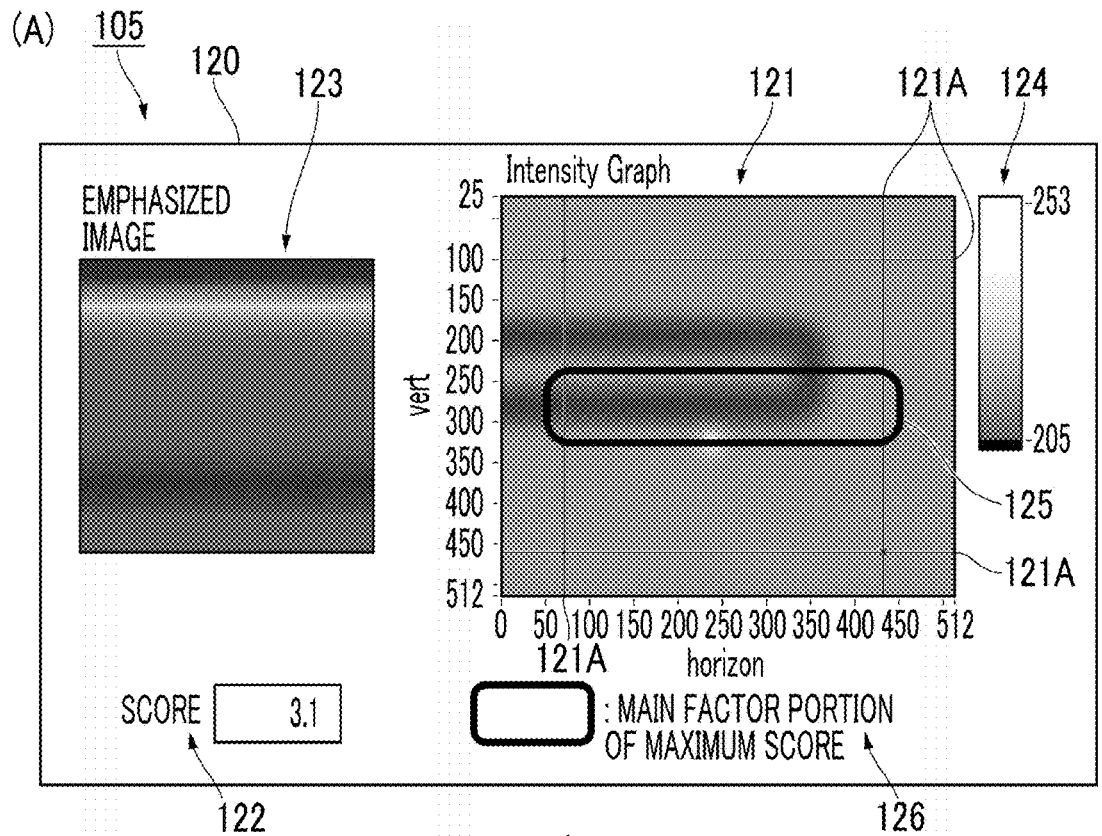
FIG. 13 is a diagram illustrating another display example of a frame line in a case where a plurality of streaky patterns are included, in which a part (A) in FIG. 13 is a screen for displaying a frame line indicating a main factor portion of the maximum score and a part (B) in FIG. 13 is a screen for displaying a frame line indicating a main factor portion of the second highest score.
Figure 13:
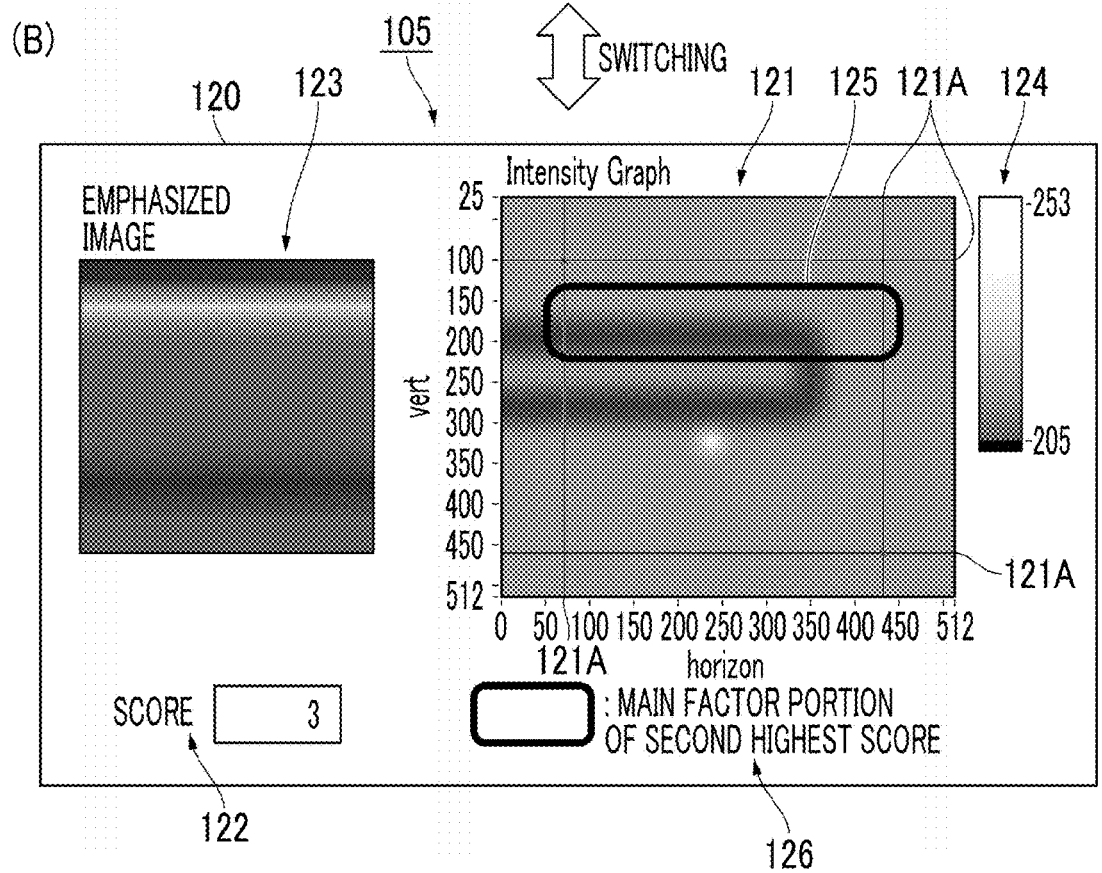

FIG. 13 is a diagram illustrating another display example of the frame line 125 in a case where a plurality of streaky patterns are included. A part (A) in FIG. 13 is a screen for displaying the frame line 125 indicating the main factor portion of the maximum score, and a part (B) in FIG. 13 is a screen for displaying the frame line 125 indicating the main factor portion of the second highest score.

In FIG. 13, portions corresponding to the portions in FIG. 11 are denoted by the corresponding reference numerals.

The screen examples shown in FIG. 13 are used in a case where a plurality of scores larger than a predetermined threshold value are found or in a case where a plurality of scores whose difference from the maximum value of the score is less than the threshold value are found.

In the case of FIG. 13, the position of the frame line 125 combined with the image captured by the camera 107 and the numerical value displayed in the score field 122 are sequentially switched.

For example, in a case where the operator taps the captured image field 121, the screen of the part (A) in FIG. 13 is switched to the screen of the part (B) in FIG. 13, and in a case where the operator further taps the captured image field 121, the screen of the part (B) in FIG. 13 is switched to the screen of the part (A) in FIG. 13.

"3.1" is displayed in the score field 122 of the operation screen 120 shown in the part (A) in FIG. 13, and the wording "main factor portion of the maximum score" is displayed in the legend 126. The operator who checked this display knows that the score of the partial region corresponding to the frame line 125 displayed in the captured image field 121 is "3.1", and that the value is the maximum value of the score within the inspection range.

On the other hand, "3" is displayed in the score field 122 of the operation screen 120 shown in the part (B) in FIG. 13, and the wording "main factor portion of the second highest score" is displayed in the legend 126. The operator who checked this display knows that the score of the partial region corresponding to the frame line 125 displayed in the captured image field 121 is "3", and that the value is the second highest value of the score within the inspection range.

Although the operation screen 120 shown in FIG. 13 assumes that there are two scores to be displayed, in a case where there are three or more scores to be displayed, the operation screen 120 is switched to three or more screens.

However, in a case where the number of screens to be switched is larger than the predetermined threshold value, by providing a function to return to the screen before the switching by a specific operation, the efficiency of the check work of the operator is realized as compared with the case where the screen can be switched only in the forward order.

Further, the screen switching may be executed by the processor 101 in units of several seconds.

Screen Example 7

Figure 14:
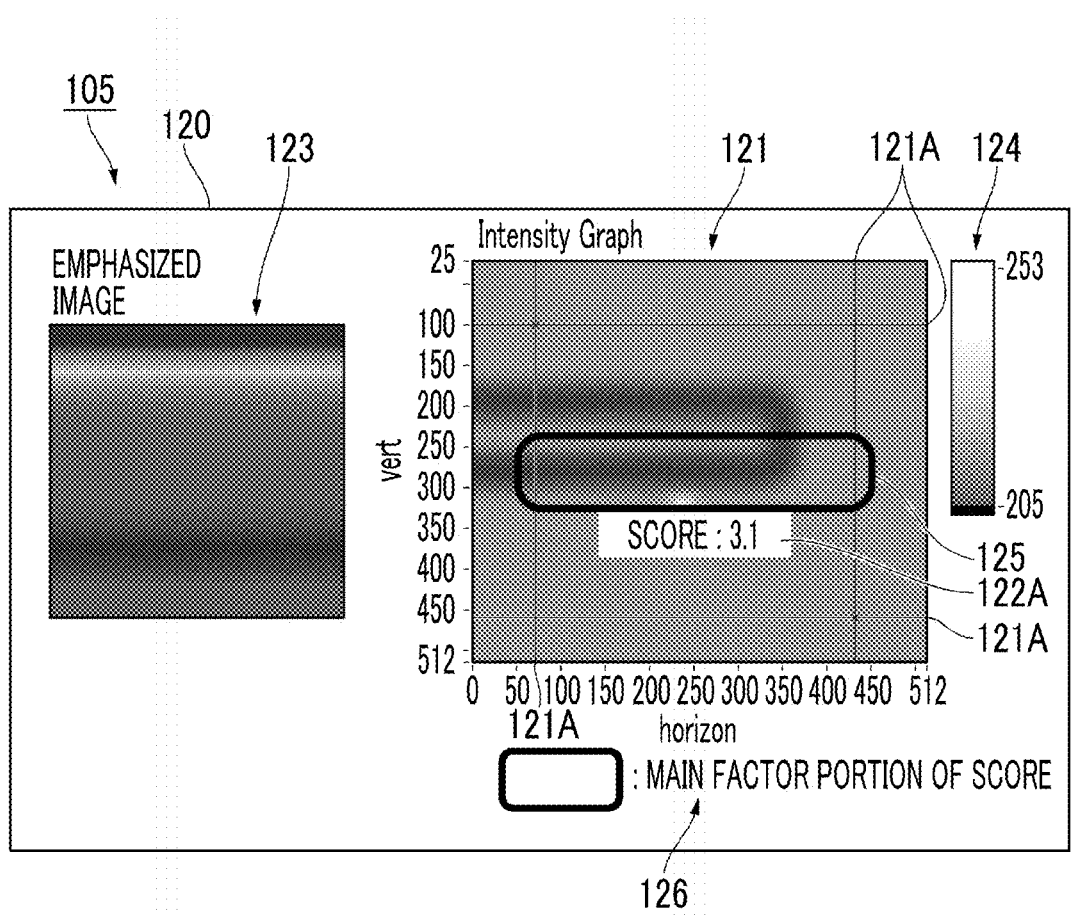
FIG. 14 is a diagram illustrating a display example of a score representing the quality of the surface.

FIG. 14 is a diagram illustrating a display example of a score representing the quality of the surface. In FIG. 14, portions corresponding to the portions in FIG. 8 are denoted by the corresponding reference numerals.

In the case of the operation screen 120 shown in FIG. 14, the score field 122 is not arranged below the emphasized image field 123.

Meanwhile, in the case of the operation screen 120 shown in FIG. 14, a score field 122A is displayed alongside the frame line 125. This display makes it easier for the operator to ascertain the relationship between the score and the corresponding partial region.

In the example of FIG. 14, the score field 122A is arranged below the frame line 125, but the score field may be arranged at other positions such as right side, left side, and upper side.

Figure 15:
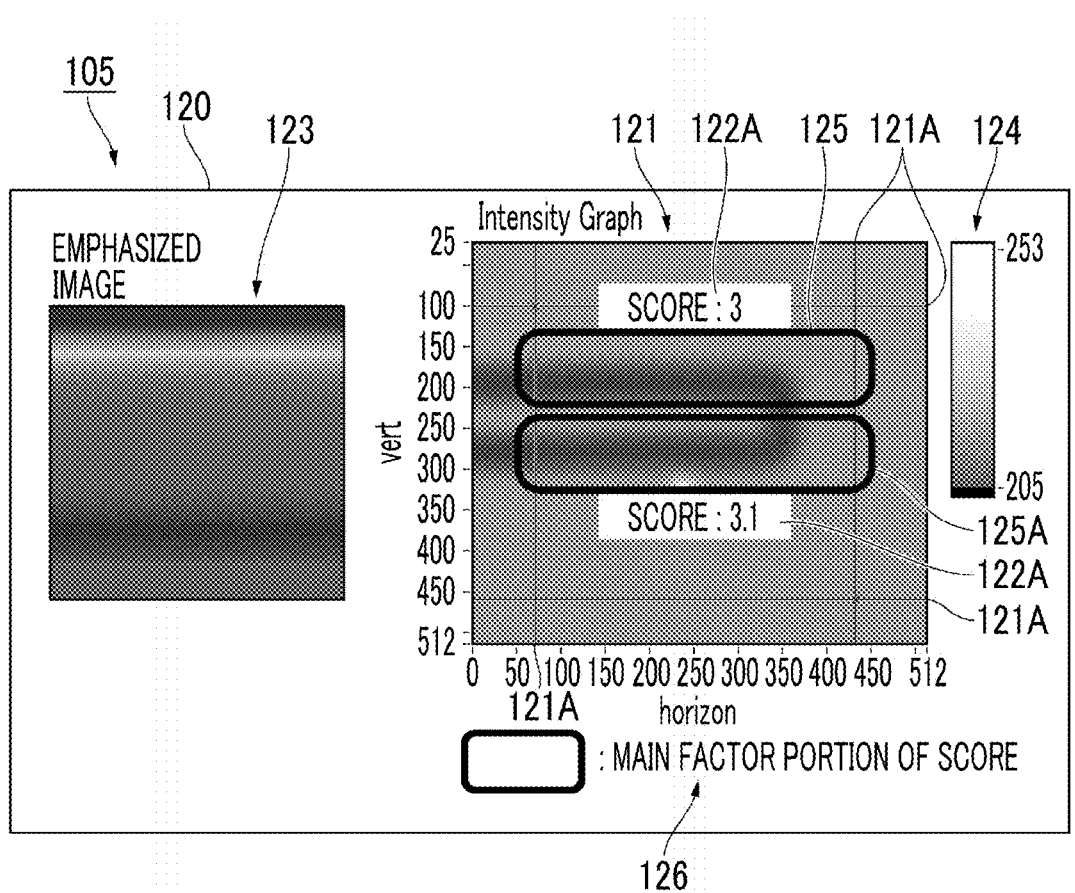
FIG. 15 is a diagram illustrating another display example of a score representing the quality of the surface.

FIG. 15 is a diagram illustrating another display example of a score representing the quality of the surface. In FIG. 15, portions corresponding to the portions in FIG. 14 are denoted by the corresponding reference numerals.

In the case of FIG. 15, two frame lines 125 are displayed in the captured image field 121. In the case of FIG. 15, the display form of the two frame lines 125 is identical as in screen example 4 (see FIG. 11).

Meanwhile, in the case of the operation screen 120 shown in FIG. 15, since the corresponding score field 122A is displayed alongside the frame line 125, it is possible to know the score calculated from the corresponding partial region even in a case where the display form of the two frame lines 125 is identical.

In the case of FIG. 15, the score of the upper pattern is "3", and the score of the lower pattern is "3.1".

Screen Example 8

Figure 16:
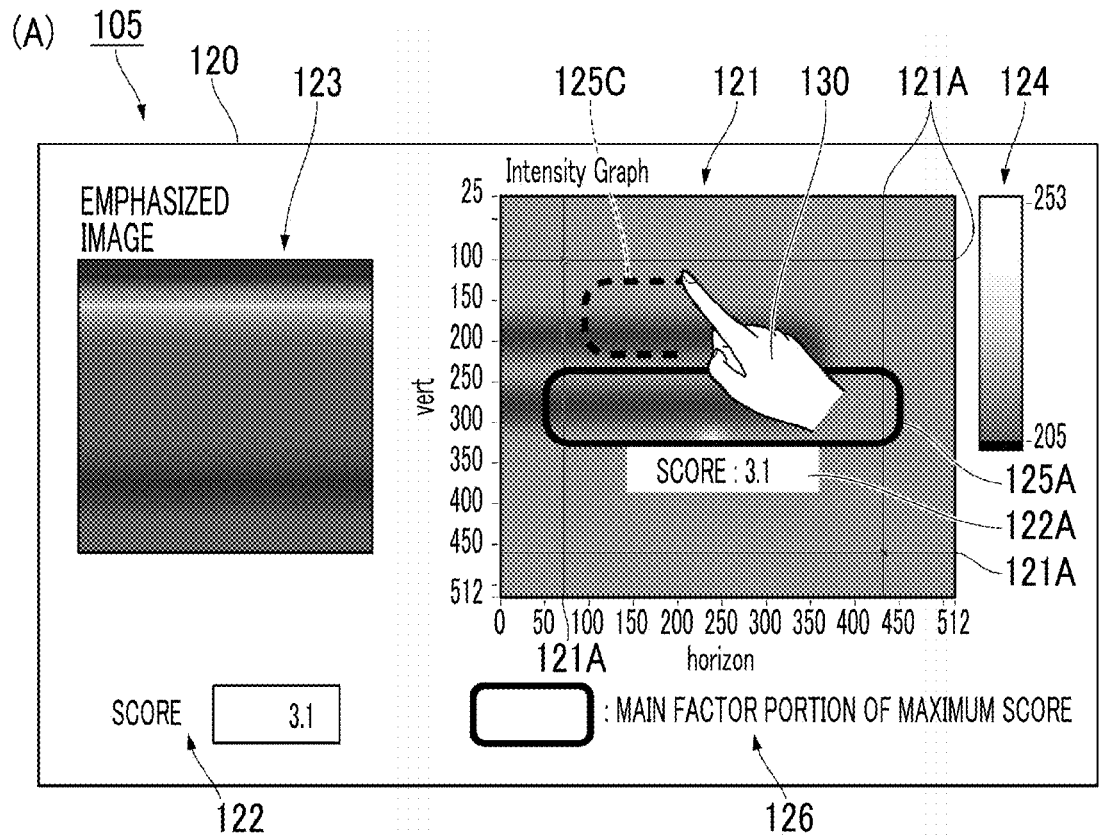
FIG. 16 is a diagram illustrating an example of additionally displaying a score of a partial region designated by an operator, in which a part (A) in FIG. 16 is a diagram illustrating the designation of the partial region by the operator and a part (B) in FIG. 16 shows a display example of the operation screen after the designation.
Figure 16:
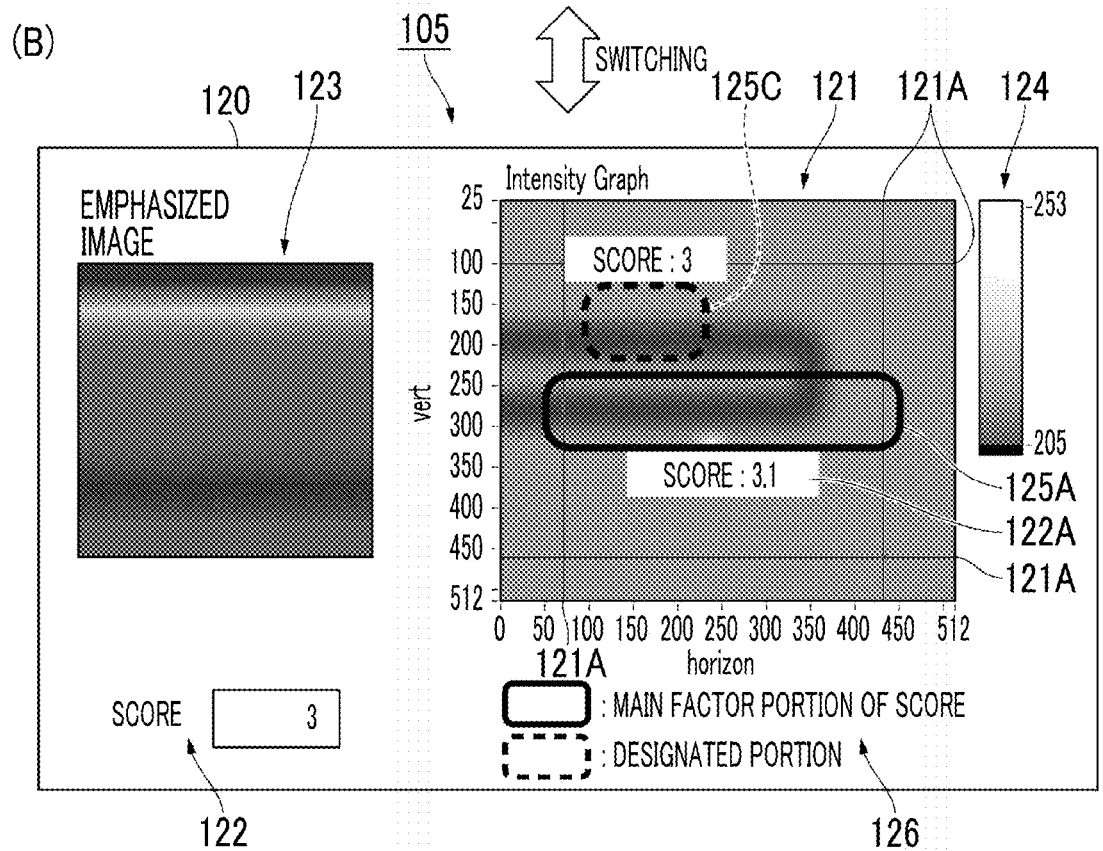

FIG. 16 is a diagram illustrating an example of additionally displaying a score of a partial region designated by an operator. A part (A) in FIG. 16 is a diagram illustrating the designation of the partial region by the operator, and a part (B) in FIG. 16 shows a display example of the operation screen 120 after the designation. In FIG. 16, portions corresponding to the portions in FIG. 15 are denoted by the corresponding reference numerals.

In the part (A) in FIG. 16, it is assumed that the display 105 is a touch panel. The operator instructs the processor 101 of a partial region for which the score is to be calculated by moving a fingertip 130 so as to surround the partial region for which the score of the display field 121 is to be checked.

The legend 126 of the part (B) in FIG. 16 shows that a frame line 125C is a portion designated by the operator.

Further, in the case of the part (B) in FIG. 16, the frame line 125C is displayed in a color different from the frame line 125 displayed by the processor 101. In FIG. 16, the difference in color is expressed by the difference in line type.

In the case of the part (B) in FIG. 16, the score of the portion designated by the operator is "3". With this function, the operator can freely check the score of the portion of interest.

The designation of the portion where the score is to be calculated is not limited to the case where the outer edge of the corresponding partial region is designated, but can also be performed by tapping the point of attention. In this case, the processor 101 may determine the partial region including the tapped point and calculate the score.

Screen Example 9

Figure 17A:
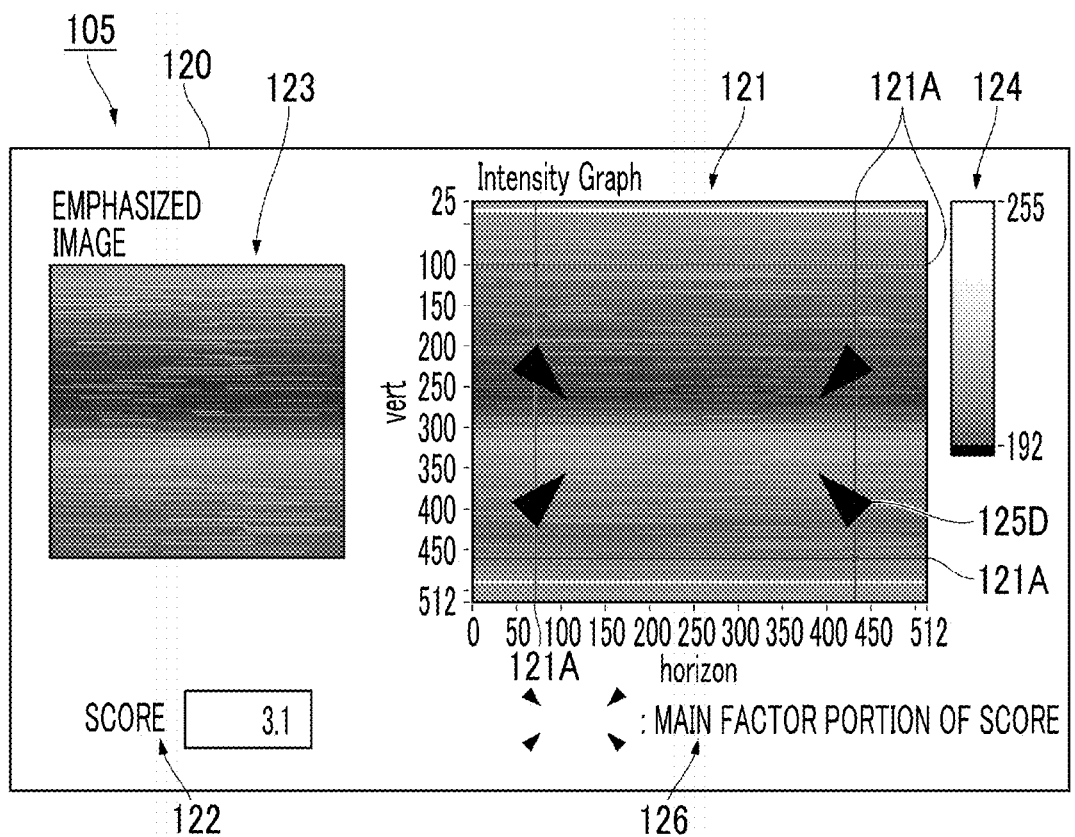
Figure 17B:
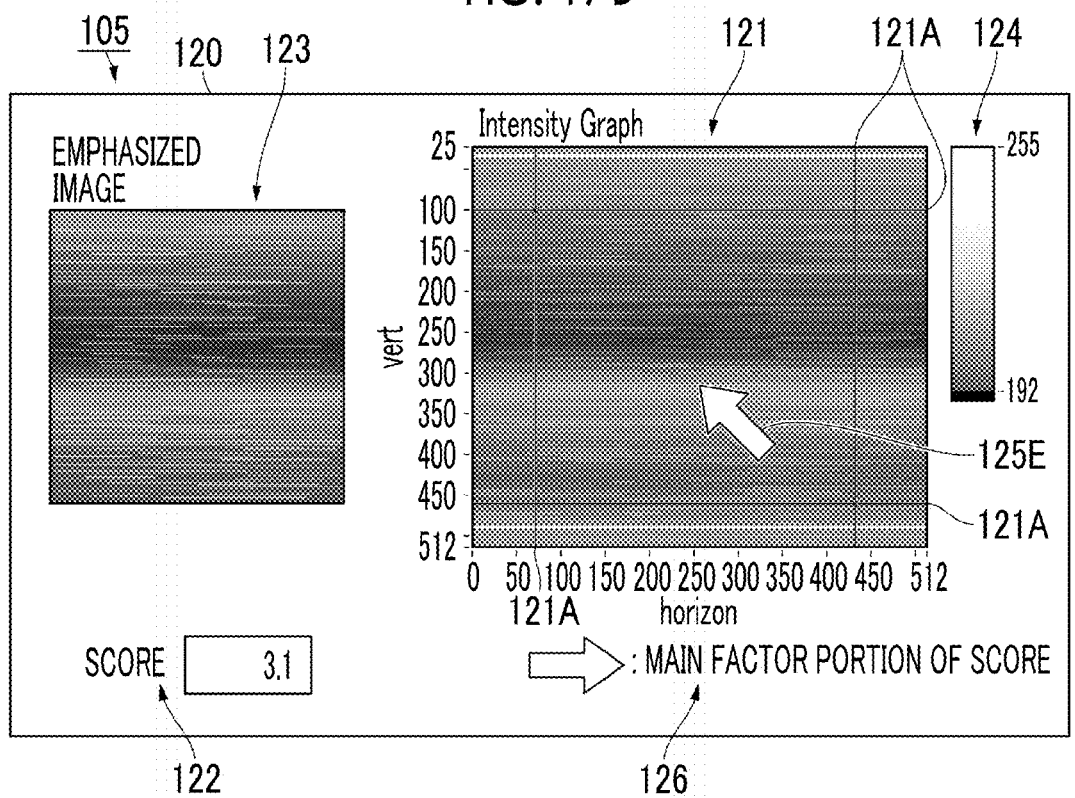

FIGS. 17A and 17B are diagrams illustrating another example of an index representing a main factor portion used to calculate a score. FIG. 17A shows a case where a symbol is displayed at a position serving as a guide for an outer edge of a target partial region, and FIG. 17B shows a case where the target partial region is represented by an arrow. In FIGS. 17A and 17B, portions corresponding to the portions in FIG. 6 are denoted by the corresponding reference numerals.

On the operation screen 120 shown in FIG. 17A, triangular symbols 125D are displayed at the four corners of the main factor portion used to calculate the score. The mode of this display also allows the operator to know the partial region used to calculate the calculated score. The shape of the symbol 125D is an example, and other shapes such as a circle and a star may be used.

On the other hand, on the operation screen 120 shown in FIG. 17B, the approximate position of the main factor portion used to calculate the score is indicated by an arrow 125E.

In the display by the arrow 125E, the range of the main factor portion cannot be known. However, as in the case of screen example 2 (see FIG. 9), in the case where the outer edge of the structure is shown, it can be seen that the partial region used to calculate the score is different from the region of interest of the operator.

Screen Example 10

Figure 18:
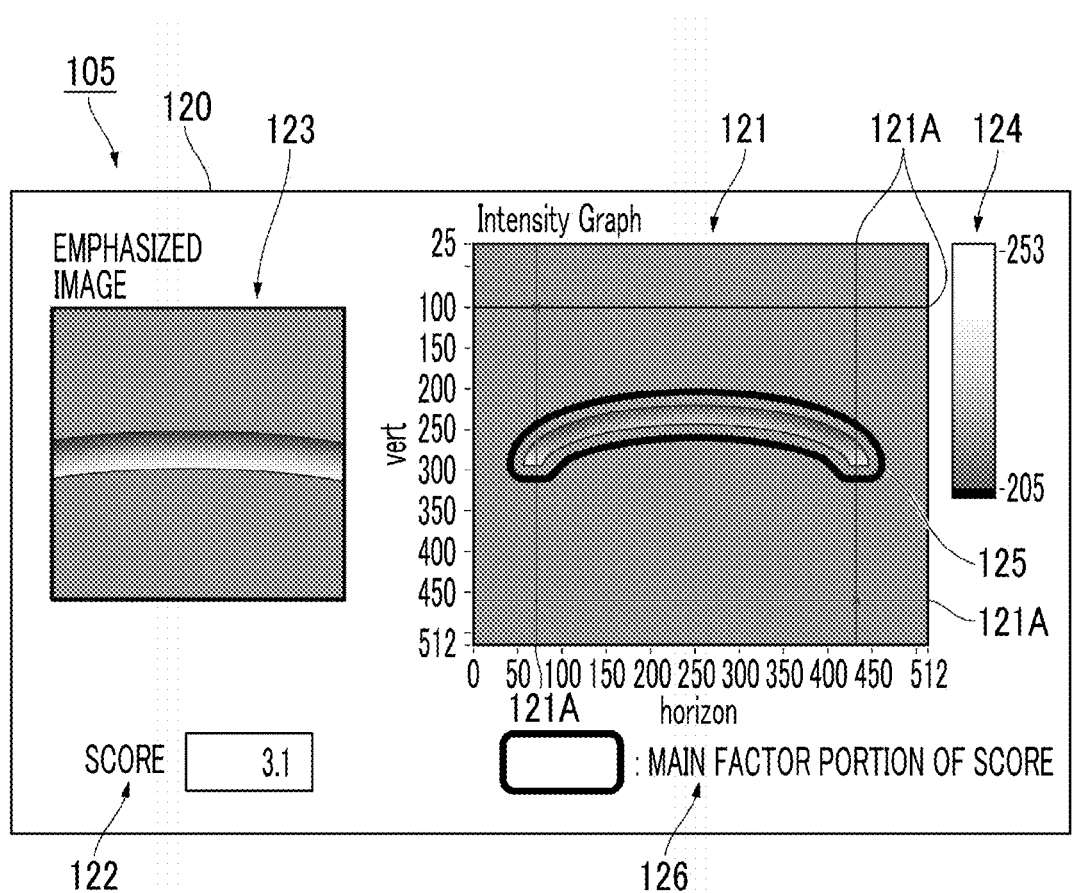
FIG. 18 is a diagram showing another display example of a frame line indicating a partial region that has contributed to the calculation of the score.

FIG. 18 is a diagram showing another display example of the frame line 125 indicating a partial region that has contributed to the calculation of the score. In FIG. 18, portions corresponding to the portions in FIG. 8 are denoted by the corresponding reference numerals.

In the case of the operation screen 120 shown in FIG. 18, a sink mark having a curved shape is displayed in the captured image field 121 captured by the camera 107 (see FIGS. 4A and 4B).

The frame line 125 in the other screen examples was substantially rectangular, but the frame line 125 shown in FIG. 18 is a curved line. That is, the shape of the frame line 125 is not limited to a substantially rectangular shape, and various shapes can be employed depending on the shape of the defect.

Second Exemplary Embodiment

In the case of the present exemplary embodiment, the surface inspection apparatus 1 (see FIG. 1) that does not require the operation of the imaging button in calculating the score will be described.

The appearance configuration and the like of the surface inspection apparatus 1 according to the present exemplary embodiment are identical to the appearance configuration and the like of the surface inspection apparatus 1 described in the first exemplary embodiment.

Figure 19:
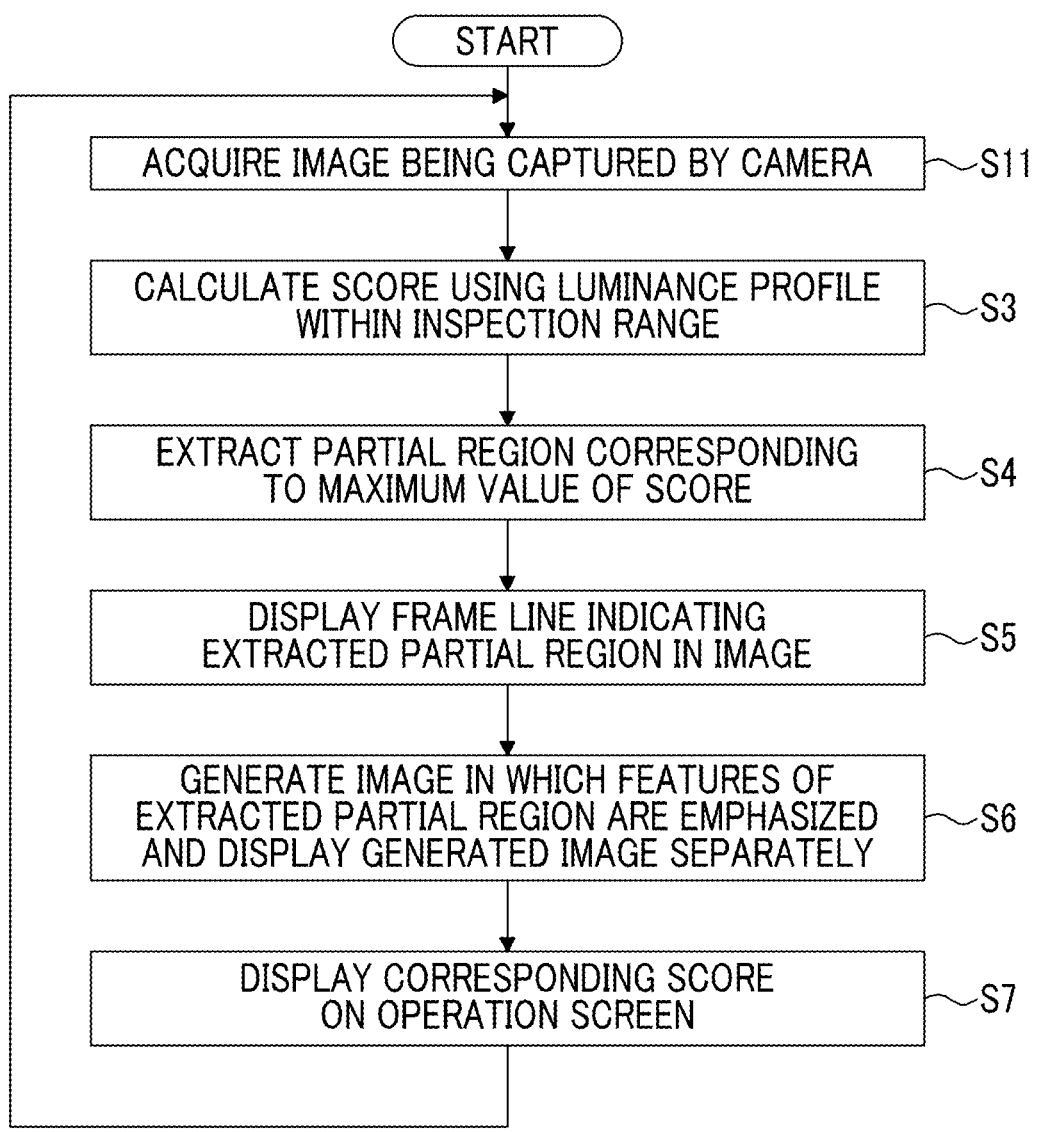
FIG. 19 is a flowchart illustrating an example of an inspection operation by a surface inspection apparatus used in a second exemplary embodiment.

FIG. 19 is a flowchart illustrating an example of an inspection operation by a surface inspection apparatus 1 used in a second exemplary embodiment. In FIG. 19, portions corresponding to the portions in FIG. 5 are denoted by the corresponding reference numerals.

In the case of FIG. 19, in the processor 101 (see FIGS. 4A and 4B), the light source 108 (see FIGS. 4A and 4B) is turned on by operating the power button, the imaging by the camera 107 (see FIGS. 4A and 4B) is started, and the score calculation and the like are performed at the same time.

Therefore, in a case where the processor 101 acquires the image being captured by the camera 107 (step S11), the processor 101 calculates the score using the luminance profile within the inspection range (step S3).

Hereinafter, the processor 101 extracts a partial region corresponding to the maximum value of the score (step S4), displays the frame line 125 (see FIG. 8) indicating the extracted partial region, displays an image of the corresponding partial region, and displays the corresponding score (steps S5 to S7).

After the end of step S7, the processor 101 returns to step S11 and repeatedly executes a series of processes. By repeating this series of processes, the score displayed on the operation screen 120 (see FIG. 8) is continuously updated according to the change of the image captured by the camera 107.

That is, in a case where the position imaged by the camera 107 changes, the positions of the score and the frame line 125 also change.

Third Exemplary Embodiment

Figure 20:
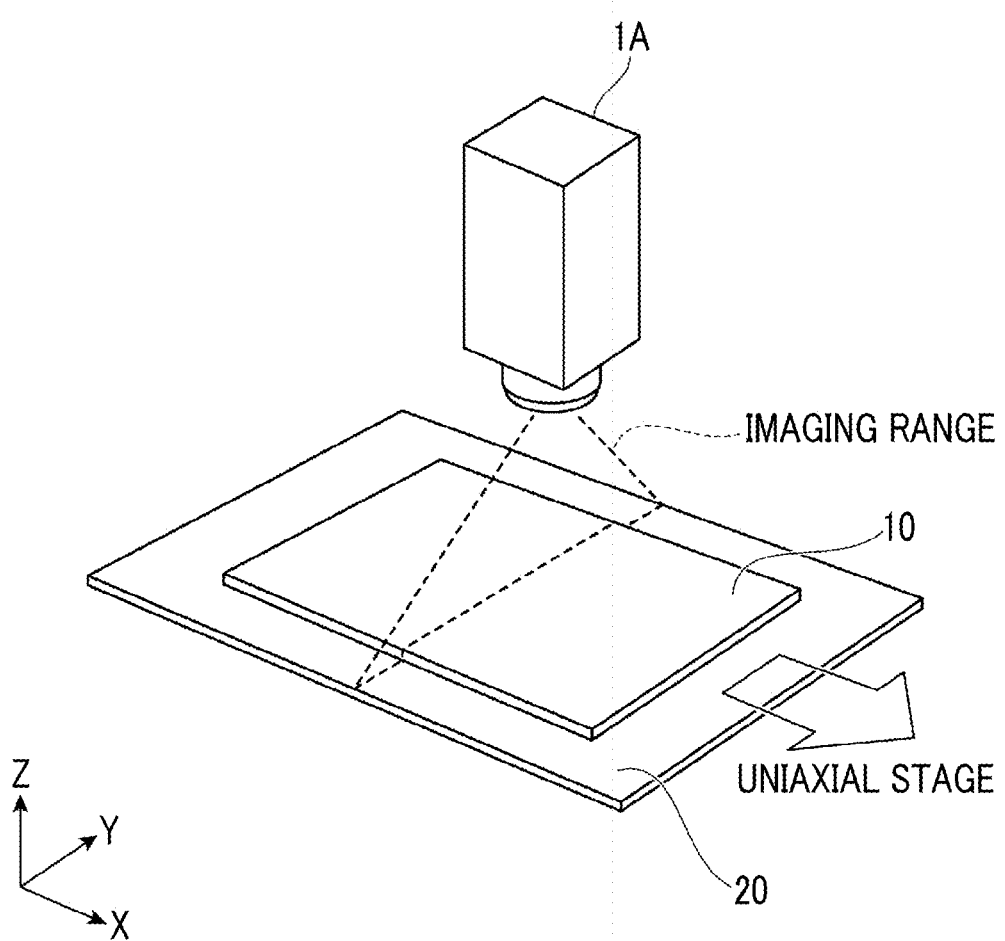
FIG. 20 is a diagram illustrating a usage example of a surface inspection apparatus assumed in a third exemplary embodiment.

FIG. 20 is a diagram illustrating a usage example of a surface inspection apparatus 1A assumed in a third exemplary embodiment. In FIG. 20, portions corresponding to the portions in FIG. 1 are denoted by the corresponding reference numerals.

A so-called line camera is used for an imaging unit of the surface inspection apparatus 1A used in the present exemplary embodiment. Therefore, the imaging range is linear.

In the case of the present exemplary embodiment, at the time of inspection, an inspection target 10 is moved in the direction of the arrow while being installed on a uniaxial stage 20. By moving the uniaxial stage 20 in one direction, the entire inspection target 10 is imaged.

The positional relationship between the camera 107 (see FIGS. 4A and 4B) and the light source 108 (see FIGS. 4A and 4B) is identical to the positional relationship between the camera 107 and the light source 108 of the first exemplary embodiment, except that the line camera is used as the camera 107 (see FIGS. 4A and 4B).

Other Exemplary Embodiments (1) Although the exemplary embodiments of the present invention have been described above, the technical scope of the present invention is not limited to the scope described in the above-described exemplary embodiments. It is clear from the description of the claims that the above-described exemplary embodiments with various modifications or improvements are also included in the technical scope of the present invention.

(2) In the above-described exemplary embodiments, a color camera is used as the camera 107 (see FIGS. 4A and 4B), but a monochrome camera may also be used. Further, the surface of the inspection target 10 (see FIG. 1) may be inspected using only the green (G) component of the color camera.

(3) In the above-described exemplary embodiments, a white light source is used as the light source 108 (see FIG. 4A), but the illumination light may be any color.

Further, the illumination light is not limited to visible light, but may be infrared light, ultraviolet light, or the like.

(4) In the above-described exemplary embodiments, the surface inspection apparatus 1 (see FIG. 1) using one light source 108 (see FIGS. 4A and 4B) has been described, but the surface of the inspection target 10 is illuminated by using a plurality of light sources.

For example, two light sources may be used. In that case, one light source may be arranged at an angle at which a specular-reflected light component is mainly incident on the camera 107 (see FIGS. 4A and 4B), and the other light source may be arranged at an angle at which a diffusely reflected light component is mainly incident on the camera 107. In this case, the two light sources may be arranged on both sides of the optical axis of the camera 107, or may be arranged alongside on one side with respect to the optical axis of the camera 107.

(5) In the above-described exemplary embodiments, a parallel light source is used as the light source 108 (see FIGS. 4A and 4B), but a point light source or a surface light source which is a non-parallel light source may be used. Further, a non-telecentric lens may be used on the optical axis of the camera 107 (see FIGS. 4A and 4B). In a case where a telecentric lens or parallel light is not used, the apparatus can be downsized and the cost can be reduced as compared with the surface inspection apparatus 1 (see FIG. 1) described in the exemplary embodiments.

(6) In the above-described exemplary embodiments, the processor 101 (see FIG. 3) of the surface inspection apparatus 1 (see FIG. 1) that images the inspection target 10 (see FIG. 1) realizes a function of calculating a score and displaying the frame line 125 (see FIG. 8) indicating the primary partial region that has contributed to the calculation of the score on the operation screen 120 (see FIG. 8). However, an equivalent function may be realized by a processor of an external computer or server that acquires image data from the surface inspection apparatus 1.

(7) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A surface inspection apparatus comprising:
an imaging device configured to image a surface of an object to be inspected; and
a processor configured to
calculate a numerical value representing a quality of the surface by processing an image captured by the imaging device, wherein calculate the numerical value comprising:
determine luminance values of at least a portion of the image and calculate the numerical value based on a difference of the luminance values of the portion of the image in which a convex portion has a higher luminance value than a flat surface and a concave portion has a lower luminance value than the flat surface, and
display, on a display device, the image including an index for specifying a position of the portion that has contributed to the calculation of the numerical value and the numerical value.

2. The surface inspection apparatus according to claim 1, wherein the index for specifying the position provides a boundary between a part of the image comprising the portion with the numerical value having differences of luminance values exceeding a threshold and another portion having a similar numerical value or higher as the portion and other parts of the image.

3. The surface inspection apparatus according to claim 2, wherein the index for specifying the position is a frame line surrounding a periphery of the portion.

4. The surface inspection apparatus according to claim 1, wherein the processor is configured to:
in a case where there are a plurality of candidates for the numerical value, display the index for specifying the position of the portion corresponding to a largest numerical value.

5. The surface inspection apparatus according to claim 1, wherein the processor is configured to:
in a case where there are a plurality of candidates for the numerical value, display the index for specifying the position of the portion corresponding to each candidate.

6. The surface inspection apparatus according to claim 5, wherein the processor is configured to:
in a case where a plurality of the indices are displayed, associate an order of magnitudes of the corresponding numerical values with a display form of the indices.

7. The surface inspection apparatus according to claim 5, wherein the processor is configured to:
in a case where a plurality of the indices are displayed, switch a display of the numerical values and the indices in an order of magnitudes of the corresponding numerical values.

8. The surface inspection apparatus according to claim 1, wherein the processor is configured to:
display the numerical value side by side with the corresponding index.

9. The surface inspection apparatus according to claim 2, wherein the processor is configured to:
display the numerical value side by side with the corresponding index.

10. The surface inspection apparatus according to claim 3, wherein the processor is configured to display the numerical value side by side with the corresponding index.

11. The surface inspection apparatus according to claim 4, wherein the processor is configured to:
display the numerical value side by side with the corresponding index.

12. The surface inspection apparatus according to claim 5, wherein the processor is configured to:
display the numerical value side by side with the corresponding index.

13. The surface inspection apparatus according to claim 6, wherein the processor is configured to:
display the numerical value side by side with the corresponding index.

14. The surface inspection apparatus according to claim 1, wherein the processor is configured to:
in a case where a designation of a region for the image is received, display the numerical value calculated for the region side by side with the corresponding region.

15. The surface inspection apparatus according to claim 1, wherein the processor is configured to:
notify a user in a case where a luminance difference in the image corresponding to the portion is greater than a predetermined threshold value.

16. The surface inspection apparatus according to claim 1, wherein the processor is configured to:
in a case where an inspection is started, display the numerical value and the index on the image.

17. The surface inspection apparatus according to claim 1, wherein the processor is configured to:
in a case where an operation of giving an instruction to start an inspection is received, display the numerical value and the index on the image.

18. The surface inspection apparatus according to claim 1, wherein a main body of the surface inspection apparatus is portable.

19. A non-transitory computer readable medium storing a program causing a computer for processing an image obtained by imaging a surface of an object to be inspected with an imaging device to realize a function comprising:
calculating a numerical value representing a quality of the surface, wherein calculate the numerical value comprising:
determine luminance values of at least a portion of the image and calculate the numerical value based on a difference of the luminance values of the portion of the image in which a convex portion has a higher luminance value than a flat surface and a concave portion has a lower luminance value than the flat surface, and
displaying, on a display device, the image including an index for specifying a position of the portion that has contributed to the calculation of the numerical value and the numerical value.

20. A surface inspection method comprising:
imaging a surface of an object to be inspected; and
calculating a numerical value representing a quality of the surface by processing an image obtained by the imaging, wherein calculate the numerical value comprising:
determine luminance values of at least a portion of the image and calculate the numerical value based on a difference of the luminance values of the portion of the image in which a convex portion has a higher luminance value than a flat surface and a concave portion has a lower luminance value than the flat surface, and
displaying, on a display device, the image including an index for specifying a position of the portion that has contributed to the calculation of the numerical value and the numerical value.

* * * * *